(12) United States Patent  
Nakano et al.

(10) Patent No.: US 7,433,574 B2
(45) Date of Patent: Oct. 7, 2008

(54) AUDIO-VIDEO STREAM DATA RECORDING, REPLAYING, AND EDITING SYSTEM

(75) Inventors: Yasuhiko Nakano, Kawasaki (JP); Yukihiro Abiko, Kawasaki (JP); Yoshiyuki Okada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1067 days.

(21) Appl. No.: 10/109,323

(22) Filed: Mar. 29, 2002

(65) Prior Publication Data

US 2002/0114610 A1    Aug. 22, 2002

Related U.S. Application Data

(63) Continuation of application No. PCT/JP99/06173, filed on Nov. 5, 1999.

(51) Int. Cl.
*H04N 9/00* (2006.01)
*H04N 5/93* (2006.01)
*H04N 5/91* (2006.01)
*H04N 7/087* (2006.01)
*H04N 5/00* (2006.01)
*G11B 3/64* (2006.01)
*G06F 3/00* (2006.01)

(52) U.S. Cl. .............................. 386/39; 386/52; 386/55; 386/69; 386/84; 386/95; 386/96; 386/98; 386/104; 386/126; 369/84; 715/723

(58) Field of Classification Search .................. 386/39, 386/68, 95, 126; 705/57; 725/51, 87; 369/47
See application file for complete search history.

(56) References Cited

U.S. PATENT DOCUMENTS

| | | | | |
|---|---|---|---|---|
| 5,920,529 A | * | 7/1999 | Ota et al. ..................... 369/84 |
| 6,141,491 A | * | 10/2000 | Yamagishi et al. .......... 386/109 |
| 6,195,497 B1 | * | 2/2001 | Nagasaka et al. ............. 386/46 |
| 6,285,825 B1 | * | 9/2001 | Miwa et al. ................... 386/98 |
| 6,516,134 B1 | * | 2/2003 | Fujita ........................... 386/95 |
| 6,577,812 B1 | * | 6/2003 | Kikuchi et al. .............. 386/105 |
| 6,640,044 B2 | * | 10/2003 | Greenwood et al. ........... 386/52 |

FOREIGN PATENT DOCUMENTS

| | | |
|---|---|---|
| JP | 7-226902 | 8/1995 |
| JP | 8-45193 | 2/1996 |
| JP | 9-45051 | 2/1997 |

* cited by examiner

*Primary Examiner*—Thai Tran
*Assistant Examiner*—Syed Y Hasan
(74) *Attorney, Agent, or Firm*—Staas & Halsey LLP

(57) ABSTRACT

A stream data recording apparatus records stream data in such a manner that the head of each video coding unit and the head of a series of audio coding unit corresponding to each video coding unit contained in the stream data coincide with the heads of access units of a recording medium. Utilizing the structure of stream data so recorded and the random accessibility of the recording medium, a stream data replaying apparatus and a stream data editing apparatus replay or edit the stream data freely on a video coding unit basis. By replacing stream data recorded on the recording medium on a video coding unit basis, the recording apparatus realizes endless recording that does not require complex file manipulation.

20 Claims, 29 Drawing Sheets

| GOP NO. | MANAGING INFORMATION FOR GOP(SECTOR NO.) | AAU NO. | MANAGING INFORMATION FOR AAU(SECTOR NO.) |
|---|---|---|---|
| 1 | SV1 | 1 | SA1 |
| ... | ... | ... | ... |
| i | SVi | ai | SAi |
| ... | ... | ... | ... |
| n | SVn | an | SAn |

(b)

| GOP NO. | HEAD ADDRESS FOR GOP | TIME STAMP | AAU NO. | HEAD ADDRESS FOR AAU | TIME STAMP |
|---|---|---|---|---|---|
| 1 | AV1 | TP1 | 1 | AA1 | TA1 |
| ... | ... | ... | ... | ... | ... |
| i | AVi | TPi | ai | AAi | TAi |
| ... | ... | ... | ... | ... | ... |
| n | AVn | TPn | an | AAn | TAn |

| IDENTIFIER | GOP NO. | SECTOR INCLUDING GOP HEAD | AAU NO. | SECTOR INCLUDING HEAD AAU |
|---|---|---|---|---|
| S | 1 | $p1_s$ | 1 | $A1_s$ |
| M1 | k | $pk_s$ | ak | $Aak_s$ |
| ⋮ | ⋮ | ⋮ | ⋮ | ⋮ |
| M16 | j | $pj_s$ | aj | $Aaj_s$ |
| ⋮ | ⋮ | ⋮ | ⋮ | ⋮ |

AUDIO-VIDEO STREAM DATA RECORDING, REPLAYING, AND EDITING SYSTEM

CROSS-REFERENCE TO RELATED APPLICATION

This Application is a continuation application of International Application PCT/JP99/06173, filed Nov. 5, 1999, and designating the U.S.

BACKGROUND OF THE INVENTION

1. Field of the Invention

The present invention relates to an audio-video stream data recording, replaying, and editing system for recording, replaying, and editing audio-video stream data such as MPEG system stream data in which video data and audio data are mixed with each other.

In recent years, even personal computers of relatively low prices have come to be equipped with a large-capacity hard disk drive. And the prices of encoders for coding analog video and audio according to the MPEG scheme are decreasing.

Further, digital satellite broadcasting services, digital video delivery services using cable television, and like services are spreading.

The above mean that a technical environment that is necessary for general users to record, replay, and edit audio-video entertainment contents that are digital information as they do conventional analog audio and video programs is being established.

With such a variation in environment, a technique that allows general users to record, replay, and edit digital video easily and freely is needed.

2. Description of the Related Art

FIG. 27 shows the configuration of a digital audio-video delivery service system.

In this digital audio-video delivery service system, a video encoder 411 and an audio encoder 412 that are provided in a server 410 encode a video signal and an audio signal according to the MPEG scheme and pass a resulting video elementary stream and audio elementary stream to a multiplexer 413, respectively. The multiplexer 413 is also provided in the server 410.

The multiplexer 413 forms an MPEG system stream by combining the video elementary stream and the audio elementary stream while making adjustments relating to their bit rates. Further, the multiplexer 413 divides the MPEG system stream into packets that are suitable for transmission and pass the MPEG system stream to a transmission device 414 on a packet-by-packet basis.

As shown in FIG. 6, the MPEG system stream formed by the multiplexer 413 is stream data in which GOPs (groups of pictures) that are coding units of the video signal and AAUs (audio access units) that are coding units of the audio signal are mixed with each other according to their bit rates. The MPEG system stream is delivered to terminal devices 420 over a network by the transmission device 414.

Since the amount of MPEG system stream data that is delivered over the network is sufficiently smaller than that of the video data and the audio data before the coding, it is sufficiently realistic to store MPEG system stream data received by a communication controlling section 422 in, for example, a stream data storing section 421 that is provided in each terminal device 420 shown in FIG. 27.

In this case, after the MPEG system stream data is delivered, it can be read out in order from the head from the stream data storing section 421 by a stream data reading section 423 and coded video data and coded audio data can be subjected to replaying processing of an audio-video replaying section 424 when necessary.

A video decoder 425 and an audio decoder 426 that are provided in the audio-video replaying section 424 shown in FIG. 27 decode coded video data and coded audio data that are passed from the stream data reading section 423 and pass decoding results to a display controlling section 427 and an audio replaying section 428, respectively, whereby video and audio are replayed (output) by video/audio output devices such as a CRT display device (denoted by CRT in FIG. 27) 429 and a speaker 430. A user can enjoy the contents that are delivered by this service whenever he wants to do so.

In consideration of the fact that the prices of encoders that conform to the MPEG scheme have decreased, a system is now realistic in which a user captures an analog video signal and audio signal into his own personal computer, coding those signals, and storing resulting data as stream data.

FIG. 28 shows the configuration of an exemplary stream data recording and replaying system.

As shown in FIG. 28, a multiplexer 431 that is provided in a personal computer of a user forms an MPEG system stream by combining a video elementary stream that is received from a video encoder 411 and an audio elementary stream that is received from an audio encoder 412.

While receiving the MPEG system stream, a stream data writing section 432 stores it in a hard disk drive 434 via a disk controlling device 433.

Incidentally, stream data that is stored in this manner in the hard disk drive 434 is basically the same as stream data that is stored in the stream data storing section 421 of the personal computer of a user in the above-described digital audio-video delivery service system. That is, the stream data can be replayed in such a manner that the video and audio are synchronized with each other only when the stream data is read out in order from the head by a stream data reading section 423 and passed to processing of the audio-video replaying section 424.

This is because, as described above, the video signal and the audio signal were coded and compressed independently by the video encoder 411 and the audio encoder 412 with their heads used as references and the resulting elementary streams were combined with each other by the multiplexer 413 in forming the MPEG system stream with their heads used as references, the MPEG system stream being recorded in the hard disk drive 434 as it was.

Therefore, conventionally, the user needs to follow a complex procedure when he edits the video and audio of MPEG system stream data he stored before.

FIG. 29 illustrates a conventional stream data editing operation.

To edit stream data, first, a user needs to replay the entire stream data containing an intended scene via an audio-video replaying section and identify an editing subject scene while watching and hearing outputs of a CRT display device and a speaker.

At this time, an enormous amount of replayed data corresponding to an analog video signal and audio signal needs to be stored for later edit processing.

An edit processing section can edit the data corresponding to the analog video signal and audio signal if receiving a proper edit instruction. However, it is necessary to form an MPEG system stream again based on an editing result with a video encoder, an audio encoder, and a multiplexer (MUX) after completion of an edit operation.

Therefore, in the related art, a stream data editing operation is necessarily accompanied by encoding again an analog video signal and audio signal that were obtained by decoding. And an enormous recording capacity is needed to store data that were needed for the replaying of the analog video signal and audio signal.

The feature of an MPEG system stream as described above restricts a format that is used in recording stream data.

For example, the following method needs to be employed in recording an MPEG system stream that is not limited in length by using a limited storage area, that is, in performing endless recording, in the stream data recording and replaying system of FIG. 28.

Video data and audio data that should form a single stream ordinarily are recorded as a sequence of files of separate stream data having a predetermined short duration (e.g., 10 sec).

This method can realize endless recording by replacing the oldest file with the newest one. However, this method has problems that the file management is complex and the part of replacement cannot be changed freely.

SUMMARY OF THE INVENTION

An object of the present invention is to provide a stream data replaying apparatus capable of replaying digital audio-video stream data with a high degree of freedom.

Another object of the invention is to provide a stream data editing apparatus capable of editing digital audio-video stream data quickly and freely.

Another object of the invention is to provide a stream data recording apparatus capable of recording digital audio-video stream data with a high degree of freedom.

Another object of the invention is to provide a technique of recording stream data in a form suitable for realizing the above stream data replaying apparatus, stream data editing apparatus, and stream data recording apparatus.

Another object of the invention is to provide a technique of reducing the amount of managing information used in the above stream data replaying apparatus, stream data editing apparatus, and stream data recording apparatus.

Another object of the invention is to provide a technique of forming stream data in a form that is effective in the above stream data replaying apparatus, stream data editing apparatus, and stream data recording apparatus.

Another object of the invention is to make it possible to perform a replay manipulation and an edit manipulation freely utilizing the ransom accessibility of a medium in which stream data is stored.

Another object of the invention is to make it possible to eliminate limitations of a time-series nature in stream data and thereby perform replay processing freely on a video coding unit basis.

Still another object of the invention is to make it possible to perform an edit manipulation freely for each combination of a video coding unit and a series of audio coding units corresponding to it.

Yet another object of the invention is to allow general users to edit stream data freely in homes at very realistic costs by making it possible to edit stream data while keeping it in stream data form.

A further object of the invention is to realize endless recording, which enables stream data having an unlimited length to be recorded, at a sufficiently realistic cost, by using a limited recording area cyclically in a stream data recording apparatus.

According to one of the aspects of a stream data recording apparatus in the present invention, one of the objects is achieved by the stream data recording apparatus which records, in a stream data storing part, stream data formed according to a digital coding scheme such as MPEG, wherein a type-boundary detecting part detects a head of each of the video coding units contained in the stream data that is input through a stream data input part and a head of a series of audio coding units corresponding to each of the video coding units, a recording part for recording the stream data in the stream data storing part in such a manner that the heads of the video coding units and the heads of the series of audio coding units coincide with heads of access units of a randomly accessible recording medium that is provided in the stream data storing part, a sample collecting part collects video data locating information relating to storage locations of heads of at least part of the video coding units and audio data locating information relating to storage locations of heads of series of audio coding units corresponding to the part or more of the video coding units as the recording part records the stream data, and the collected video data locating information and audio data locating information are stored in a managing information storing part.

In this stream data recording apparatus, correspondence between video coding units and audio coding units can be recognized based on managing information that is stored in the managing information storing part and video coding units and series of audio coding units corresponding to the video coding unit can be manipulated on an access-unit basis in the stream data storing part. Therefore, a replay and an edit can be performed on a video coding unit basis.

According to one of the aspects of a stream data recording apparatus in the present invention, one of the objects is achieved by the stream data recording apparatus may further comprise a shortage detecting part for monitoring, in response to an endless recording instruction, a recording operation that is performed by the recording part on video coding units and audio coding units, and for detecting whether an available area of a predetermined storage area allocated for endless recording is short; a recording controlling part for moving, to a head of the predetermined recording area, a recording pointer that indicates a location of the stream data storing part where new stream data should be recorded, the moving done in accordance with a detection result of the shortage detecting part; and a managing information updating part for deleting head video data locating information and head audio data locating information that are stored in the managing information storing part in accordance with the detection result of the shortage detecting part.

This stream data recording apparatus can realize endless recording by cyclically using a continuous recording area allocated for endless recording.

According to one of the aspects of a stream data recording apparatus in the present invention, one of the objects is achieved by the stream data recording apparatus which may further comprise a type-alternation detecting part for monitoring stream data that is input to the recording part, detecting a boundary between data belonging to a video coding unit and data belonging to an audio coding unit, and supplying boundary information indicating a position of the boundary to the recording part.

In this stream data recording apparatus, digital video information and digital audio information contained in stream data can be recorded separately on the storage medium of the stream data storing part, in way such as having the recording part record data in storage locations corresponding to boundary information.

According to one of the aspects of a stream data recording apparatus in the present invention, one of the objects is achieved by the stream data input part of the stream data recording apparatus which may comprise a video pack forming part for dividing a video stream into video packs that are equal in capacity to the access unit of the stream data storing part; an audio pack forming part for dividing an audio stream into audio packs that are equal in capacity to the access unit of the stream data storing part; a packing controlling part for monitoring operation of the video pack forming part and the audio pack forming part, and for issuing a separation instruction to put the video stream or the audio stream into a new pack when a head of each video coding unit or a head of a series of audio coding units corresponding to each video coding unit appears; and a synthesizing part for combining the video packs formed by the video pack forming part and the audio packs formed by the audio pack forming part to output as a single stream data.

With this stream data input part, stream data can be input to the recording part, the stream data including video packs and audio packs in which the head of each video coding unit and the head of a series of audio coding unit corresponding to each video coding unit are located at the heads of the video and audio packs. Therefore, when the stream data is directly written to the stream data storing part, the head of each video coding unit and the head of a series of audio coding unit corresponding to each video coding unit can be stored from the heads of access units.

According to one of the aspects of a stream data recording apparatus in the present invention, one of the objects is achieved by the stream data input part, in which the video pack forming part may comprise a video pack stuffing part for completing a video pack being formed by adding meaningless data in accordance with a remaining capacity of the video pack being formed, the adding done prior to formation of a new video pack in response to the separation instruction, and the audio pack forming part may comprise an audio pack stuffing part for completing an audio pack being formed by adding meaningless data in accordance with a remaining capacity of the audio pack being formed, the adding done prior to formation of a new audio pack in response to the separation instruction.

A video pack and audio pack not filled appear when a separation instruction is issued from the packing controlling part. The remaining portions in the packs can be filled with meaningless data, according to this stream data input part.

According to one of the aspects of a stream data recording apparatus in the present invention, one of the objects is achieved by the recording part of the stream data recording apparatus which may comprise a vacant area detecting part for detecting a vacant area remaining in an access unit under recording upon receiving boundary information; and a sector stuffing part for generating proper meaningless data and adding the meaningless data to the access unit under recording in accordance with a detection result of the vacant area detecting part.

With this recording part, the remaining portion of the access unit immediately preceding a new access unit can be filled with meaningless data, then a recording operation on the new access unit starts upon receiving boundary information.

According to one of the aspects of a stream data recording apparatus in the present invention, one of the objects is achieved by the stream data recording apparatus, in which the sample collecting part of the stream data recording apparatus may collect, every predetermined time, video data locating information relating to a video coding unit that is recorded by the recording part and audio data locating information relating to a series of audio coding unit corresponding to the video coding unit.

With this sample collecting part, by, for example, setting the interval of managing information collection longer than the time corresponding to one video coding unit, the amount of managing information to be stored in the managing information storing part can be made smaller than in a case of collecting managing information for all video coding units.

According to one of the aspects of a stream data recording apparatus in the present invention, one of the objects is achieved by the stream data replaying apparatus comprising a stream data storing part in which stream data is stored in such a manner that a head of each of video coding units and a head of a series of audio coding units corresponding to each of the video coding units contained in the stream data coincide with heads of access units of a storage medium; a managing information storing part for receiving and storing managing information that includes video data locating information indicating a storage location of the head of at least one video coding unit and audio data locating information indicating a storage location of the head of a series of audio coding units corresponding to each of the at least one video coding unit; a starting point retrieving part for retrieving, based on a video coding unit indicated by input specifying information, video data locating information corresponding to the specifying information and audio data locating information corresponding to the video data locating information from the managing information storing part; and a replaying part for reading out stream data stored in the stream data storing part based on the retrieved video data locating information and audio data locating information, and replaying video and audio based on stream data which is read out.

In this stream data replaying apparatus, for example, managing information corresponding to all video coding units is input to and stored in the managing information storing part in advance so that the replaying part can read, in accordance to the managing information, video coding units and audio coding units indicated by the received specifying information from the stream data storing part. By this, limitations of a time-series nature in the stream data can be eliminated and the stream data can be replayed freely on a video coding unit basis.

According to one of the aspects of a stream data recording apparatus in the present invention, one of the objects is achieved by the stream data replaying apparatus which may further comprise a managing information generating part for collecting video data locating information relating to storage locations of heads of at least part of the video coding units stored in the stream data storing part and audio data locating information relating to storage locations of heads of series of audio coding units corresponding to the part or more of the video coding units stored in the stream data storing part, by referring to access units of the stream data storing part prior to a replay operation on the stream data stored in the stream data storing part.

With this managing information generating part, for example, managing information relating to only stream data to be replayed can be formed and stored in the managing information storing part. This makes it unnecessary to store managing information relating to all stream data in advance. Therefore, the amount of the entire managing information can be reduced in the case where a number of stream data are stored.

According to one of the aspects of a stream data recording apparatus in the present invention, one of the objects is achieved by another stream data replaying apparatus which includes a stream data storing part in which stream data is stored in such a manner that a head of each of video coding units and a head of a series of audio coding units corresponding to each of the video coding units contained in the stream data coincide with heads of access units of a storage medium; a managing information storing part for receiving and storing managing information that includes video data locating information indicating a storage location of the head of each of video coding units and audio data locating information indicating a storage location of the head of a series of audio coding units corresponding to each of the video coding units; a locating information collecting part for searching the stream data storing part to find storage locations of the video coding unit indicated by specifying information and a series of audio coding units corresponding to the video coding unit, collecting and outputting video data locating information and audio data locating information indicating the found storage locations, and storing the collected video data locating information and audio data locating information in the managing information storing part; and a replaying part for reading out stream data stored in the stream data storing part according to the collected video data locating information and audio data locating information, and replaying video and audio based on stream data which is read out.

In this stream data replaying apparatus, upon receiving specifying information, the locating information collecting part can selectively collect managing information relating to necessary locations, store it in the managing information storing part, and subjects it to subsequent replay processing. Therefore, this stream data replaying apparatus can replay stream data freely and reduce the amount of managing information necessary for such replay processing.

According to one of the aspects of a stream data recording apparatus in the present invention, one of the objects is achieved by another stream data replaying apparatus which comprises a stream data storing part in which stream data is stored in such a manner that a head of each of video coding units and a head of a series of audio coding units corresponding to each of the video coding units contained in the stream data coincide with heads of access units of a storage medium; a starting point search part for searching the stream data storing part to find storage locations of the video coding unit indicated by specifying information and a series of audio coding units corresponding to the video coding unit, and for outputting video data locating information and audio data locating information indicating the found storage locations; and a replaying part for reading out stream data stored in the stream data storing part based on the obtained video data locating information and audio data locating information, and replaying video and audio based on stream data which is read out.

In this stream data replaying apparatus, managing information relating to necessary locations is collected selectively in response to an instruction from a user and used for a replay operation. Therefore, it becomes unnecessary to store an enormous amount of data in advance for performing the process of freely replaying stream data.

According to one of the aspects of a stream data recording apparatus in the present invention, one of the objects is achieved by the stream data editing apparatus which comprises a stream data storing part in which stream data is stored in such a manner that a head of each of video coding units and a head of a series of audio coding units corresponding to each of the video coding units contained in the stream data coincide with heads of access units of a storage medium; a managing information storing part for storing managing information that includes a storage location of the head of each of the video coding units and a storage location of the head of a series of audio coding units corresponding to each of the video coding units; a distribution information retrieving part for retrieving, from the managing information storing part, upon receiving an edit instruction including range information indicating a range of video coding units as a subject of an edit manipulation, managing information indicating storage locations of the video coding units indicated by the range information and storage locations of audio coding units corresponding to the video coding units; a target determining part for determining, based on the managing information corresponding to the range information, a storage area range of the stream data storing part that should be made a subject of the edit manipulation; an editing part for performing the edit manipulation specified by the edit instruction on the determined storage area range; and a result reflecting part for reflecting managing information indicating storage locations that have been changed by the edit manipulation by the editing part, on contents of the managing information storing part.

In this stream data editing apparatus, a storage area of the stream data storing part where specified video coding units and audio coding units can be determined based on range information. Therefore, edit processing can be performed selectively on the determined video coding units and audio coding units.

According to one of the aspects of a stream data recording apparatus in the present invention, one of the objects is achieved by another stream data editing apparatus which comprises a stream data storing part in which stream data is stored in such a manner that a head of each of video coding units and a head of a series of audio coding units corresponding to each of the video coding units contained in the stream data coincide with heads of access units of a storage medium; a managing information storing part for receiving and storing managing information indicating a storage location of the head of each of the video coding units and a storage location of the head of a series of audio coding units corresponding to each of the video coding units; a distribution information collecting part for searching, upon receiving an edit instruction including range information indicating a range of video coding units as a subject of an edit manipulation, the stream data storing part for video coding units indicated by the range information and audio coding units corresponding to the video coding units, collecting and outputting managing information indicating storage locations of the video coding units and the audio coding units thus found, and storing the collected managing information in the managing information storing part; a target determining part for determining, based on the collected managing information corresponding to the range information, a storage area range of the stream data storing part that should be made a subject of the edit manipulation; an editing part for performing the edit manipulation specified by the edit instruction on the storage area range determined based on the range information; and a result reflecting part for reflecting video data locating information and audio data locating information that have been changed by the edit manipulation by the editing part, on contents of the managing information storing part.

In this stream data editing apparatus, edit processing can be performed selectively on specified video coding units and audio coding units in response to input of range information. Further, managing information relating to necessary locations is collected selectively and stored in the managing information storing part in response to an instruction from a user, and the managing information reflects results of editing by the editing part. Resulting managing information can be used for subsequent replay processing and edit processing.

According to one of the aspects of a stream data recording apparatus in the present invention, one of the objects is achieved by another stream data editing apparatus which comprises a stream data storing part in which stream data is stored in such a manner that a head of each of video coding units and a head of a series of audio coding units corresponding to each of the video coding units contained in the stream data coincide with heads of access units of a storage medium; a target search part for searching, upon receiving an edit instruction including range information indicating a range of video coding units as a subject of an edit manipulation, the stream data storing part for video coding units indicated by the range information and audio coding units corresponding to the video coding units, and for outputting video data locating information indicating storage locations of the video coding units thus found and audio data locating information indicating storage locations of the audio coding units thus found; a target determining part for determining, based on the video data locating information and the audio data locating information corresponding to the range information, a storage area range of the stream data storing part that should be made a subject of the edit manipulation; and an editing part for performing the edit manipulation specified by the edit instruction on the storage area range determined based on the range information.

In this stream data editing apparatus, video data locating information and audio data locating information corresponding to specified video coding units are collected in response to input of range information by analyzing the contents of the stream data storing part, whereby edit processing can be performed selectively on the specified video coding units and the audio coding units.

According to one of the aspects of a stream data recording apparatus in the present invention, one of the objects is achieved by the stream data editing apparatus, in which the target determining part may determine, as a subject of the edit manipulation, all the storage area range indicated by the video data locating information and the audio data locating information corresponding to the range information.

With this target determining part, since a range of stream data to be made a subject of an edit manipulation can be determined with video information as a reference, the continuity of replayed video can be secured when edited stream data is replayed.

According to one of the aspects of a stream data recording apparatus in the present invention, one of the objects is achieved by the stream data editing apparatus, in which the target determining part may determine, as a subject of the edit manipulation, a range that is part, excluding a storage area of part of the audio coding units, of the storage area range indicated by the video data locating information and the audio data locating information corresponding to the range information.

With this target determining part, since a range of stream data to be made a subject of an edit manipulation can be determined with audio information being a standard, the continuity of replayed audio can be secured when edited stream data is replayed.

Still further objects and features of the present invention are as indicated in the detailed description described below by referring to the attached drawings.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIGS. 7A and 7B show exemplary management tables;

FIG. 23 illustrates how a read starting point is searched for;

FIG. 26 shows another exemplary management table;

DESCRIPTION OF THE PREFERRED EMBODIMENTS

Principles

First, the principles of an audio-video stream data recording, replaying, and editing system according to the present invention will be described with reference to FIGS. 1-3.

Figure 1:
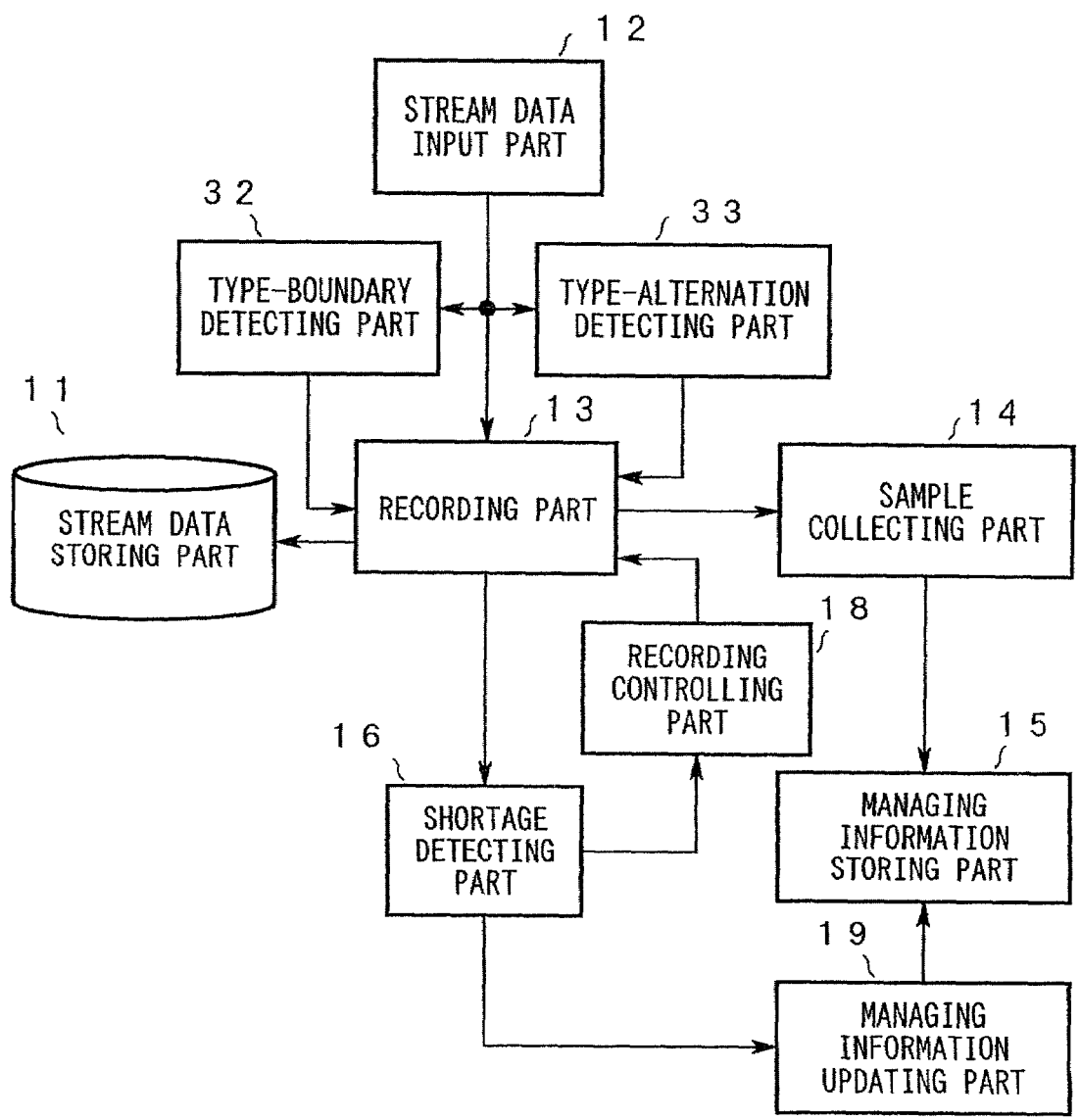
FIG. 1 is a block diagram showing the principles of stream data recording apparatuses according to the present invention.

FIG. 1 is a block diagram showing the principles of stream data recording apparatuses according to the invention.

A first stream data recording apparatus shown in FIG. 1 comprises a stream data storing part 11, a stream data input part 12, a type-boundary detecting part 32, a recording part 13, a sample collecting part 14, and a managing information storing part 15.

The principle of the first stream data recording apparatus according to the invention is as follows.

Stream data that includes video coding units that are obtained by coding a video signal according to a predetermined digital coding scheme and audio coding units that are obtained by coding an audio signal according to a predetermined digital coding scheme is to be recorded in the stream data storing part 11. The stream data input part 12 inputs the stream data. The type-boundary detecting part 32 detects boundaries of video information and audio information contained in the stream data, the boundaries being a head of each of the video coding units contained in the stream data and a head of a series of the audio coding units corresponding to each of the video coding units, and outputs boundary information indicating positions of the boundaries. The recording part 13 records a head of each of the video coding units and a head of a series of audio coding units corresponding to each of the video coding units contained in the stream data in such a manner that so as to coincide with heads of access units of a randomly accessible recording medium that is provided in the stream data storing part 11. The sample collecting part 14 collects video data locating information relating to storage locations of heads of at least part of the video coding units and audio data locating information relating to storage locations of heads of series of audio coding units corresponding to the part or more of the video coding units as the recording part 13 records the stream data. The managing information storing part 15 stores managing information that includes the video data locating information indicating the location of a stored head of each of the video coding units and the audio data locating information indicating the location of a stored head of a series of audio coding units corresponding to each of the video coding units.

The first stream data recording apparatus having the above configuration operates in the following manner.

Stream data that is input to the recording part 13 from the stream data input part 12 is recorded in the stream data storing part 11 in such a manner that the head of each video coding unit and a head of a series of audio coding unit corresponding to each video coding unit contained in the stream data coincide with the heads of access units of the stream data storing part 11. Managing information that is input from the sample collecting part 14 to the managing information storing part 15 indicates correspondence between the video coding units and the audio coding units.

As shown in FIG. 1, a second stream data recording apparatus comprises, in addition to the components of the first stream data recording apparatus, a shortage detecting part 16, a recording controlling part 18, and a managing information updating part 19.

The principle of the second stream data recording apparatus according to the invention is as follows.

The shortage detecting part 16 monitors, in response to an endless recording instruction to endlessly record input stream data in a predetermined storage area of the stream data storing part 11, a recording operation that is performed by the recording part 13 on video coding units and audio coding units, and detects whether an available area of the predetermined storage area is insufficient. The recording controlling part 18 moves, in accordance with a detection result of the shortage detecting part 16, a recording pointer that indicates a location of the stream data storing part 11 where new stream data should be recorded to a head of the predetermined storage area. The managing information updating part 19 deletes head video data locating information and head audio data locating information that are stored in the managing information storing part 15 in accordance with the detection result of the shortage detecting part 16.

The second stream data recording apparatus having the above configuration operates in the following manner.

In accordance with a detection result of the shortage detecting part 16, the recording controlling part 18 replaces the oldest stream data recorded in the predetermined storage area that is allocated for endless recording with new stream data on a video coding unit basis. The managing information updating part 19 updates the managing information in accordance with the replacement operation.

As shown in FIG. 1, a third stream data recording apparatus according to the invention comprises a type-alternation detecting part 33 in addition to the components of the first stream data recording apparatus.

The principle of the third stream data recording apparatus according to the invention is as follows.

The type-alternation detecting part 33 monitors stream data that is input to the recording part 13, detects a boundary between data belonging to a video coding unit and data belonging to an audio coding unit, and supplies boundary information indicating a position of the boundary to the recording part 13.

The third stream data recording apparatus having the above configuration operates in the following manner.

Based on boundary information obtained by the type-alternation detecting part 33, the recording part 13 records stream data in the recording medium of the stream data storing part 11 in such a manner that digital video information and digital audio information contained in the stream data are separated from each other.

The stream data input part 12 shown in FIG. 1 can be replaced by a second stream data input part. The second stream data input part according to the invention comprises a video pack forming part, an audio pack forming part, a packing controlling part, and a synthesizing part.

The principle of the second stream data input part according to the invention is as follows.

In the stream data input part 12 that is provided in the stream data recording apparatus of FIG. 1, the video pack forming part divides a video stream that includes video coding units into video packs that are equal in capacity to the access unit of the stream data storing part 11. The audio pack forming part divides an audio stream that includes audio coding units into audio packs that are equal in capacity to the access unit of the stream data storing part 11. The packing controlling part monitors operation of the video pack forming part and the audio pack forming part, and issues a separation instruction to put the video stream or the audio stream into a new pack when a head of each video coding unit or a head of a series of audio coding units corresponding to each video coding unit occurs. The synthesizing part combines the video packs formed by the video pack forming part and the audio packs formed by the audio pack forming part into single stream data.

The second stream data input part having the above configuration operates in the following manner.

The video pack forming part and the audio pack forming part operate in response to an instruction from the packing controlling part, whereby video packs and audio packs are formed in such a manner that the head of each video coding unit and the head of a series of audio coding units corresponding to each video coding unit are located at the heads of a video pack and an audio pack. The video packs and the audio packs thus formed are combined with each other by the synthesizing part into stream data.

The stream data input part 12 shown in FIG. 1 can be replaced by a third stream data input part. The third stream data input part according to the invention comprises a video pack forming part having a video pack stuffing part, an audio pack forming part having an audio pack stuffing part, a packing controlling part, and a synthesizing part.

The principle of the third stream data input part according to the invention is as follows.

In the video pack forming part that is provided in a stream data input part 12 the video pack stuffing part completes a video pack being formed by adding meaningless data that will be disregarded in decoding processing in accordance with a remaining capacity of the video pack being formed prior to formation of a new video pack in response to the separation instruction. The audio pack stuffing part that is provided in the audio pack forming part completes an audio pack being formed by adding meaningless data that will be disregarded in decoding processing in accordance with a remaining capacity of the audio pack being formed prior to formation of a new audio pack in response to the separation instruction.

The third stream data input part having the above configuration operates in the following manner.

The video pack stuffing part or the audio pack stuffing part operates when the video pack forming part or the audio pack forming part puts a video stream or an audio stream into a new video or audio pack, whereby the remaining capacity of the current video pack or audio pack is filled with meaningless data.

The recording part 13 shown in FIG. 1 can be replaced by a second recording part. The second recording part according to the invention comprises a vacant area detecting part and a sector stuffing part.

The principle of the second recording part according to the invention is as follows.

In the second recording part, the vacant area detecting part detects a vacant area remaining in an access unit under recording upon receiving boundary information. The sector stuffing part generates meaningless data that will be disregarded in decoding processing and adds the meaningless data to the access unit under recording in accordance with a detection result of the vacant area detecting part.

The second recording part having the above configuration operates in the following manner.

The sector stuffing part operates in accordance with a detection result of the vacant area detecting part, whereby the remaining portion of the access unit immediately preceding a new access unit can be filled with meaningless data, then a recording operation on the new access unit starts upon receiving boundary information.

The principle of a second sample collecting part according to the invention is as follows.

The second sample collecting part collects, every predetermined time, video data locating information relating to a video coding unit that is recorded by the recording part 13 and audio data locating information relating to a series of audio coding unit corresponding to the video coding unit.

The second sample collecting part having the above configuration operates in the following manner.

Since the second sample collecting part collects management information every predetermined time, it can collect selectively pieces of managing information corresponding to a proper number of video coding units by setting the interval of managing information collection longer than the replay time of one video coding unit.

Figure 2:
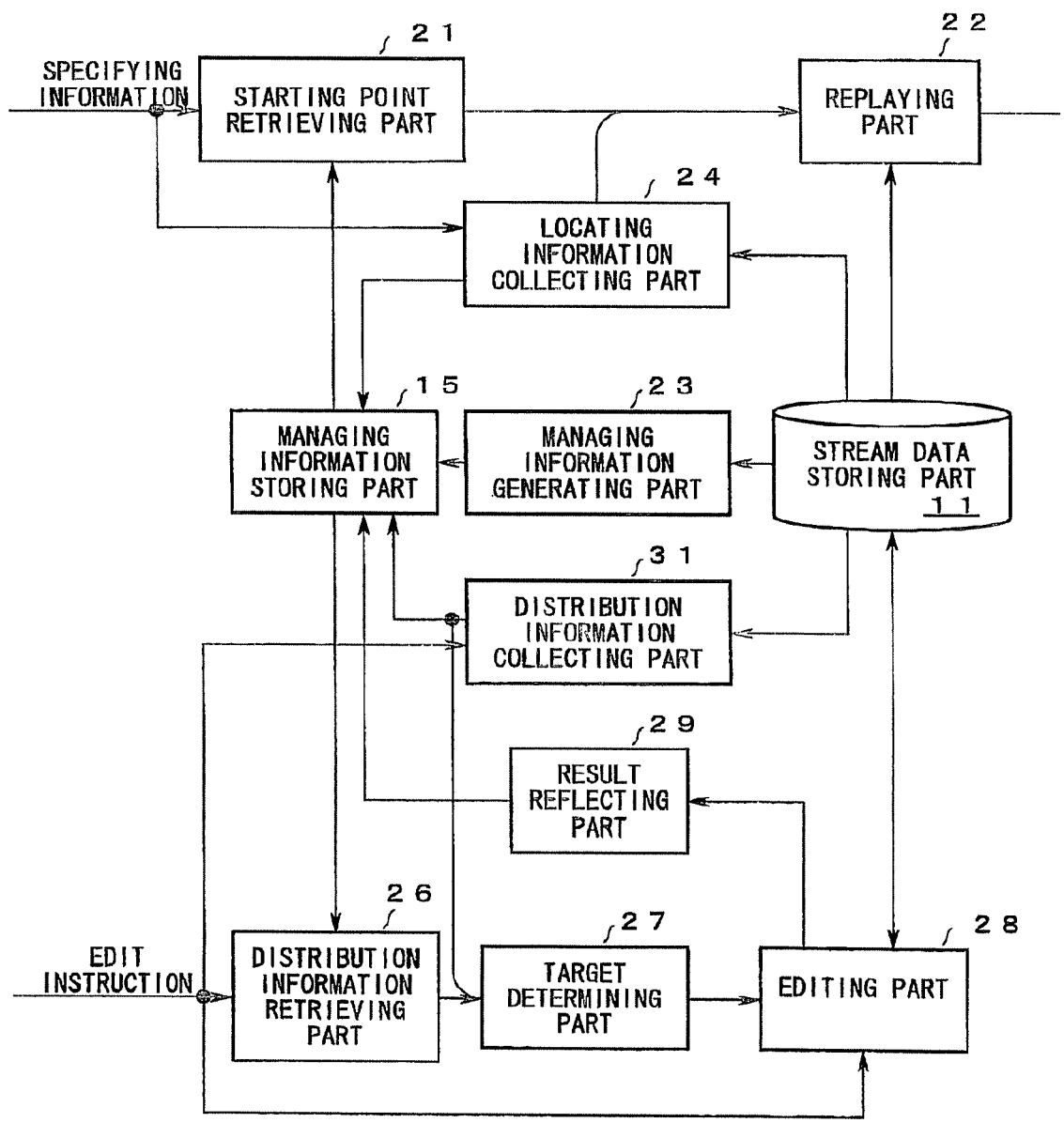
FIG. 2 is a block diagram showing the principles of stream data replaying apparatuses and stream data editing apparatuses according to the invention.

As shown in FIG. 2, a first stream data replaying apparatus according to the invention comprises a stream data storing part 11, a managing information storing part 15, a starting point retrieving part 21, and a replaying part 22.

The principle of the first stream data replaying apparatus according to the invention is as follows.

Stream data is stored in the stream data storing part 11 in such a manner that a head of each of video coding units and a head of a series of audio coding units corresponding to each of the video coding units contained in the stream data coincide with heads of access units of a randomly accessible storage medium. The managing information storing part 15 stores managing information that includes video data locating information indicating a storage location of the head of each of video coding units and audio data locating information indicating a storage location of the head of a series of audio coding units corresponding to each of the video coding units. The starting point retrieving part 21 retrieves, upon receiving specifying information indicating a video coding unit at a replay starting point, video data locating information corresponding to the specifying information and audio data locating information corresponding to the video data locating information from the managing information storing part 15. The replaying part 22 reads out stream data stored in the stream data storing part 11 based on the retrieved video data locating information and audio data locating information, and replays video and audio based on stream data which is read out.

The first stream data replaying apparatus having the above configuration operates in the following manner.

Upon receiving specifying information, the starting point retrieving part 21 can acquire video data locating information and audio data locating information that are stored in the managing information storing part 15 so as to correspond to a video coding unit indicated by the specifying information and subject the acquired information to replay processing by the replaying part 22. Based on the acquired information, the replaying part 22 reads a corresponding video coding unit and audio coding units from the stream data storing part 11.

As shown in FIG. 2, a second stream data replaying apparatus according to the invention comprises a managing information generating part 23 in addition to the components of the first stream data replaying apparatus.

The principle of the second stream data replaying apparatuses according to the invention is as follows.

The managing information generating part 23 collects video data locating information relating to storage locations of heads of at least part of the video coding units stored in the stream data storing part 11 and audio data locating information relating to storage locations of heads of series of audio coding units corresponding to the part or more of the video coding units by referring to access units of the stream data storing part 11 prior to a replay operation on the stream data stored in the stream data storing part 11.

The second stream data replaying apparatus having the above configuration operates in the following manner.

The managing information generating part 23 generates managing information by analyzing how stream data is stored in the stream data storing part 11 when necessary.

As shown in FIG. 2, a third stream data replaying apparatus according to the invention comprises a stream data storing part 11, a managing information storing part 15, a locating information collecting part 24, and a replaying part 22.

The principle of the third stream data replaying apparatus according to the invention is as follows.

Stream data is stored in the stream data storing part 11 in such a manner that a head of each of video coding units and a head of a series of audio coding units corresponding to each of the video coding units contained in the stream data coincide with heads of access units of a randomly accessible storage medium. The managing information storing part 15 stores managing information that includes video data locating information indicating a storage location of the head of each of video coding units and audio data locating information indicating a storage location of the head of a series of audio coding units corresponding to each of the video coding units. The locating information collecting part 24 searches, upon receiving specifying information indicating a video coding unit at a replay starting point, the stream data storing part 11 to find storage locations of the video coding unit indicated by the specifying information and a series of audio coding units corresponding to the video coding unit, collects and outputs video data locating information and audio data locating information indicating the found storage locations, and stores the collected video data locating information and audio data locating information in the managing information storing part 15. The replaying part 22 reads out stream data stored in the stream data storing part 11 based on the collected video data locating information and audio data locating information, and replays video and audio based on stream data which is read out.

The third stream data replaying apparatus having the above configuration operates in the following manner.

Upon receiving specifying information, the locating information collecting part 24 analyzes, for a video coding unit indicated by the specifying information, how stream data is stored in the stream data storing part 11 to collect video data locating information and audio data locating information. Then, it subjects collected video data locating information and audio data locating information to a replay operation of the replaying part 22 and stores those in the managing information storing part 15.

Figure 3:
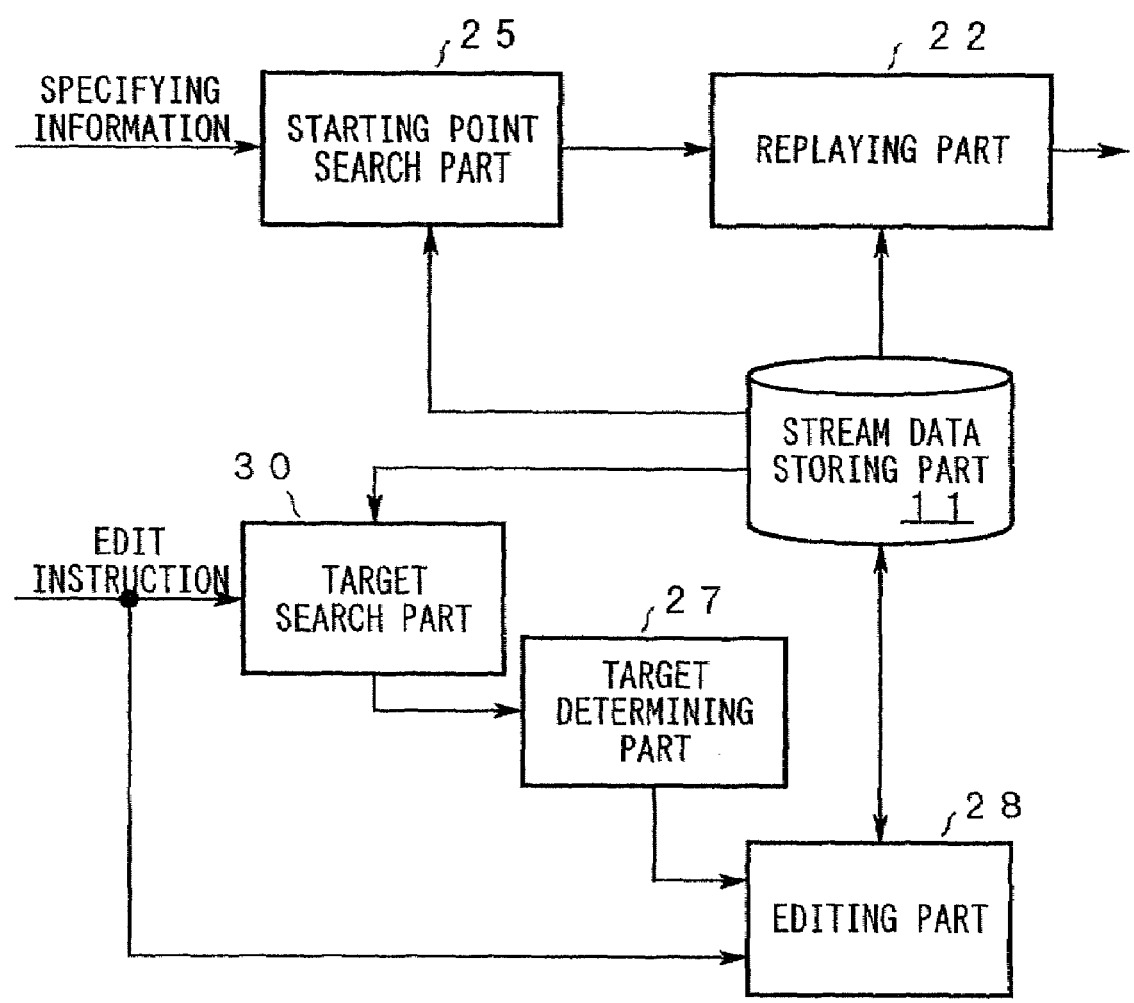
FIG. 3 is a block diagram showing the principles of another stream data replaying apparatus and another stream data editing apparatus according to the invention.

As shown in FIG. 3, a fourth stream data replaying apparatus according to the invention comprises a stream data storing part 11, a starting point search part 25, and a replaying part 22.

The principle of the fourth stream data replaying apparatus according to the invention is as follows.

Stream data is stored in the stream data storing part 11 in such a manner that a head of each of video coding units and a head of a series of audio coding units corresponding to each of the video coding units contained in the stream data coincide with heads of access units of a randomly accessible storage medium. The starting point search part 25 searches, upon receiving specifying information indicating a video coding unit at a replay starting point, the stream data storing part 11 to find storage locations of the video coding unit indicated by the specifying information and a series of audio coding units corresponding to the video coding unit, and outputs video data locating information and audio data locating information indicating the found storage locations. The replaying part 22 reads out stream data stored in the stream data storing part 11 based on the obtained video data locating information and audio data locating information, and replays video and audio based on stream data which is read out.

The fourth stream data replaying apparatus having the above configuration operates in the following manner.

In response to specifying information, the starting point search part 25 analyzes, for a video coding unit indicated by the specifying information, how stream data is stored in the stream data storing part 11 to collect video data locating information and audio data locating information. Then, it subjects collected video data locating information and audio data coding information to a replay operation of the replaying part 22.

As shown in FIG. 2, a first stream data editing apparatus according to the invention comprises a stream data storing part 11, a managing information storing part 15, a distribution information retrieving part 26, a target determining part 27, an editing part 28, and a result reflecting part 29.

The principle of the first stream data editing apparatus according to the invention is as follows.

Stream data is stored in the stream data storing part 11 in such a manner that a head of each of video coding units and a head of a series of audio coding units corresponding to each of the video coding units contained in the stream data coincide with heads of access units of a randomly accessible storage medium. The managing information storing part 15 stores managing information that includes video data locating information indicating a storage location of the head of each of video coding units and audio data locating information indicating a storage location of the head of a series of audio coding units corresponding to each of the video coding units. The distribution information retrieving part 26 retrieves, from the managing information storing part 15, upon receiving an edit instruction including range information indicating a range of video coding units as a subject of an edit manipulation, video data locating information indicating storage locations of the video coding units indicated by the range information and audio data locating information indicating storage locations of audio coding units corresponding to the video coding units. The target determining part 27 determines a storage area range of the stream data storing part 11 based on the video data locating information and the audio data locating information corresponding to the range information. The editing part 28 performs the edit manipulation specified by the edit instruction on the storage area range determined based on the range information. The result reflecting part 29 reflects video data locating information and audio data locating information that have been changed by the edit manipulation by the editing part 28, on contents of the managing information storing part 15.

The first stream data editing apparatus having the above configuration operates in the following manner.

Upon receiving range information, the distribution information retrieving part 26 retrieves, from the managing information storing part 15, video data locating information and audio data locating information corresponding to video coding units indicated by the range information and subjects those to processing of the editing part 28 via the target determining part 27. The result reflecting part 29 reflects on the managing information, in accordance with results of the editing by the editing part 28, variations in how the stream data is stored in the stream data storing part 11, and subjects resulting managing information to later replay processing or edit processing.

As shown in FIG. 2, a second stream data editing apparatus according to the invention comprises a stream data storing part 11, a managing information storing part 15, a distribution information collecting part 31, a target determining part 27, an editing part 28, and a result reflecting part 29.

The principle of the second stream data editing apparatus according to the invention is as follows.

Stream data is stored in the stream data storing part 11 in such a manner that a head of each of video coding units and a head of a series of audio coding units corresponding to each of the video coding units contained in the stream data coincide with heads of access units of a randomly accessible storage medium. The managing information storing part 15 stores managing information that includes video data locating information indicating a storage location of the head of each of video coding units and audio data locating information indicating a storage location of the head of a series of audio coding units corresponding to each of the video coding units. The distribution information collecting part 31 searches, upon receiving an edit instruction including range information indicating a range of video coding units as a subject of an edit manipulation, the stream data storing part 11 for video coding units indicated by the range information and audio coding units corresponding to the video coding units, collects and outputs video data locating information indicating storage locations of the video coding units thus found and audio data locating information indicating storage locations of the audio coding units thus found, and stores the collected video data locating information and audio data locating information in the managing information storing part 15. The target determining part 27 determines a storage area range of the stream data storing part 11 based on the video data locating information and the audio data locating information corresponding to the range information. The editing part 28 performs the edit manipulation specified by the edit instruction on the storage area range determined based on the range information. The result reflecting part 29 reflects video data locating information and audio data locating information that have been changed by the edit manipulation by the editing part 28, on contents of the managing information storing part 15.

The second stream data editing apparatus having the above configuration operates in the following manner.

Upon receiving range information, the distribution information collecting part 31 analyses, for selected video coding units indicated by the range information, how stream data is stored in the stream data storing part 11 to collect video data locating information and audio data locating information. Then, it subjects collected video data locating information and audio data coding information to processing of the editing part 28 via the target determining part 27. Managing information that has been collected selectively for necessary locations is stored in the managing information storing part 15, and the result reflecting part 29 reflects the result of the managing information to reflect results of the editing by the editing part 28. Resulting managing information is used for later edit processing.

As shown in FIG. 3, a third stream data editing apparatus according to the invention comprises a stream data storing part 11, a target search part 30, a target determining part 27, and an editing part 28.

The principle of the third stream data editing apparatus according to the invention is as follows.

Stream data is stored in the stream data storing part 11 in such a manner that a head of each of video coding units and a head of a series of audio coding units corresponding to each of the video coding units contained in the stream data coincide with heads of access units of a randomly accessible storage medium. The target search part 30 searches, upon receiving an edit instruction including range information indicating a range of video coding units as a subject of an edit manipulation, the stream data storing part 11 for video coding units indicated by the range information and audio coding units corresponding to the video coding units, and outputs video data locating information indicating storage locations of the video coding units thus found and audio data locating information indicating storage locations of the audio coding units thus found. The target determining part 27 determines a storage area range of the stream data storing part 11 based on the video data locating information and the audio data locating information corresponding to the range information. The editing part 28 performs the edit manipulation specified by the edit instruction on the storage area range determined based on the range information.

The third stream data editing apparatus having the above configuration operates in the following manner.

Upon receiving range information, the target search part 30 analyzes, for video coding units indicated by the range information, how stream data is stored in the stream data storing part 11 to collect video data locating information and audio data locating information. Then, it subjects collected video data locating information and audio data locating information to processing of the editing part 28 via the target determining part 27.

The target determining part 27 shown in FIGS. 2 and 3 can be replaced by a second target determining part. The principle of a second target determining part according to the invention is as follows.

The second target determining part 27 determines, as a subject of the edit manipulation, all the storage area range indicated by the video data locating information and the audio data locating information corresponding to the range information.

The second target determining part having the above configuration operates in the following manner.

The second target determining part determines a range of stream data that should be made a subject of the edit manipulation using video information as a reference.

The target determining part 27 shown in FIGS. 2 and 3 can be replaced by a second target determining part. The principle of a third target determining part according to the invention is as follows.

The third target determining part determines, as a subject of the edit manipulation, a range that is part, excluding a storage area of part of the audio coding units, of the storage area range indicated by the video data locating information and the audio data locating information corresponding to the range information.

The third target determining part having the above configuration operates in the following manner.

The third target determining part determines a range of stream data that should be made a subject of the edit manipulation using audio information as a reference.

Embodiment 1

Figure 4:
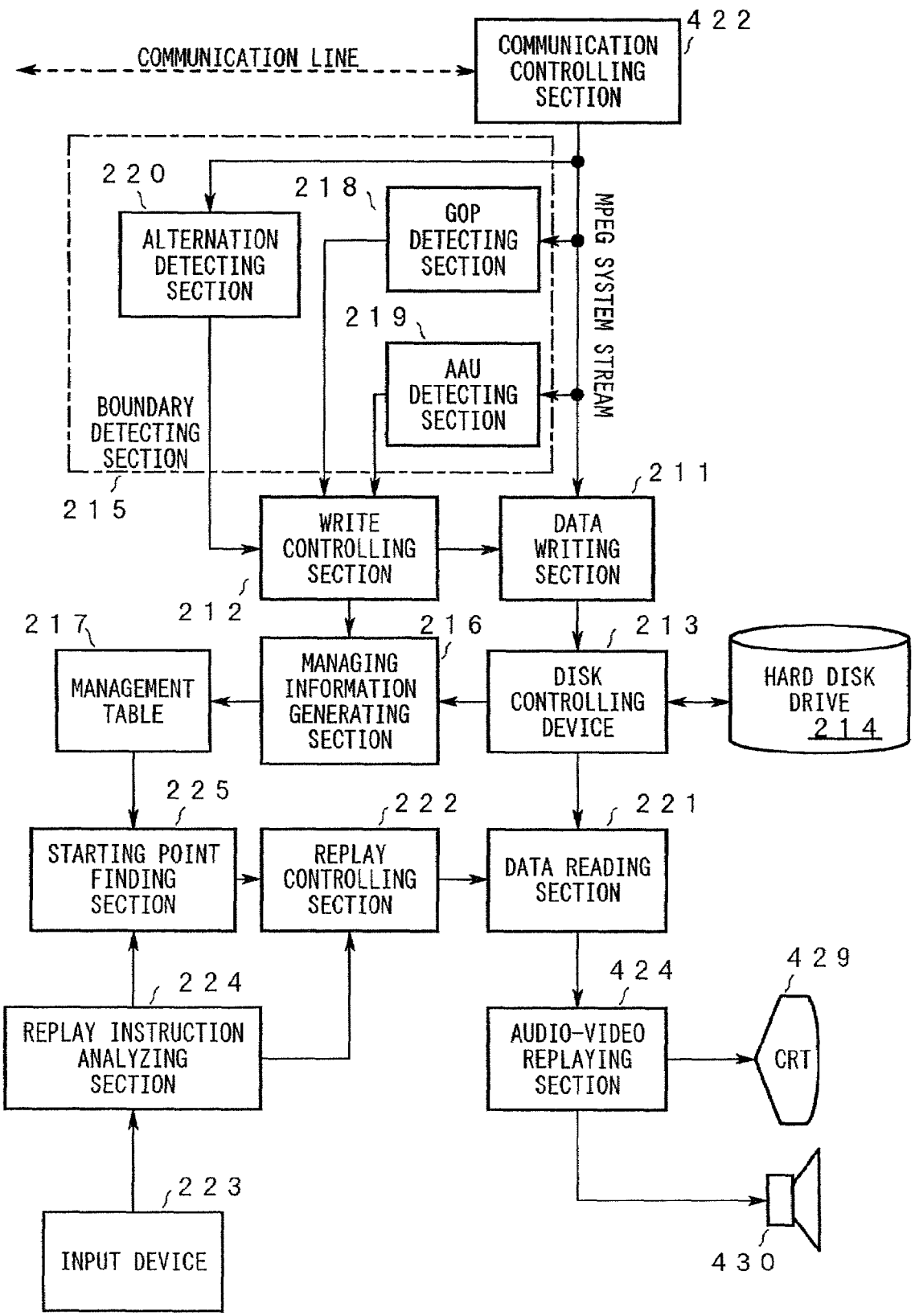
FIG. 4 shows a stream data recording apparatus and a stream data replaying apparatus according to a first embodiment of the invention.

FIG. 4 shows a stream data recording apparatus and a stream data replaying apparatus according to a first embodiment of the invention.

In the stream data recording and replaying system shown in FIG. 4, an MPEG system stream that is supplied over a communication line is passed from a communication controlling section 422 to a data writing section 211. The data writing section 211 performs a write operation (described later) according to instructions from a write controlling section 212, whereby the MPEG system stream is recorded in a hard disk drive 214 via a disk controlling device 213.

In FIG. 4, the write controlling section 212 controls the write operation of the data writing section 211 based on boundary information that is extracted by a boundary detecting section 215. At this time, the write controlling section 212 instructs a managing information generating section 216 to generate managing information corresponding to video data locating information and audio data locating information as described above in the principles section.

The managing information generated by the managing information generating section 216 is held by a management table 217 that corresponds to the managing information storing part 15 shown in FIG. 1, and will be used for replay processing by the stream data replaying apparatus (described later).

Having part of the functions of the type-boundary detecting part 32 shown in FIG. 1, a GOP detecting section 218 of the boundary detecting section 215 shown in FIG. 4 detects the head of GOPs that are included in the MPEG system stream that is passed to the data writing section 211 and informs the write controlling section 212 about it. An AAU detecting section 219 detects the head of AAUs that are included in the MPEG system stream that is passed to the data writing section 211 and informs the write controlling section 212 about it.

On the other hand, an alternation detecting section 220 corresponds to the type-alternation detecting part 33 shown in FIG. 1. The alternation detecting section 220 detects boundaries where the type of data that is passed to the data writing section 211 changes and informs the write controlling section 212 about the detected boundaries.

Figure 5:
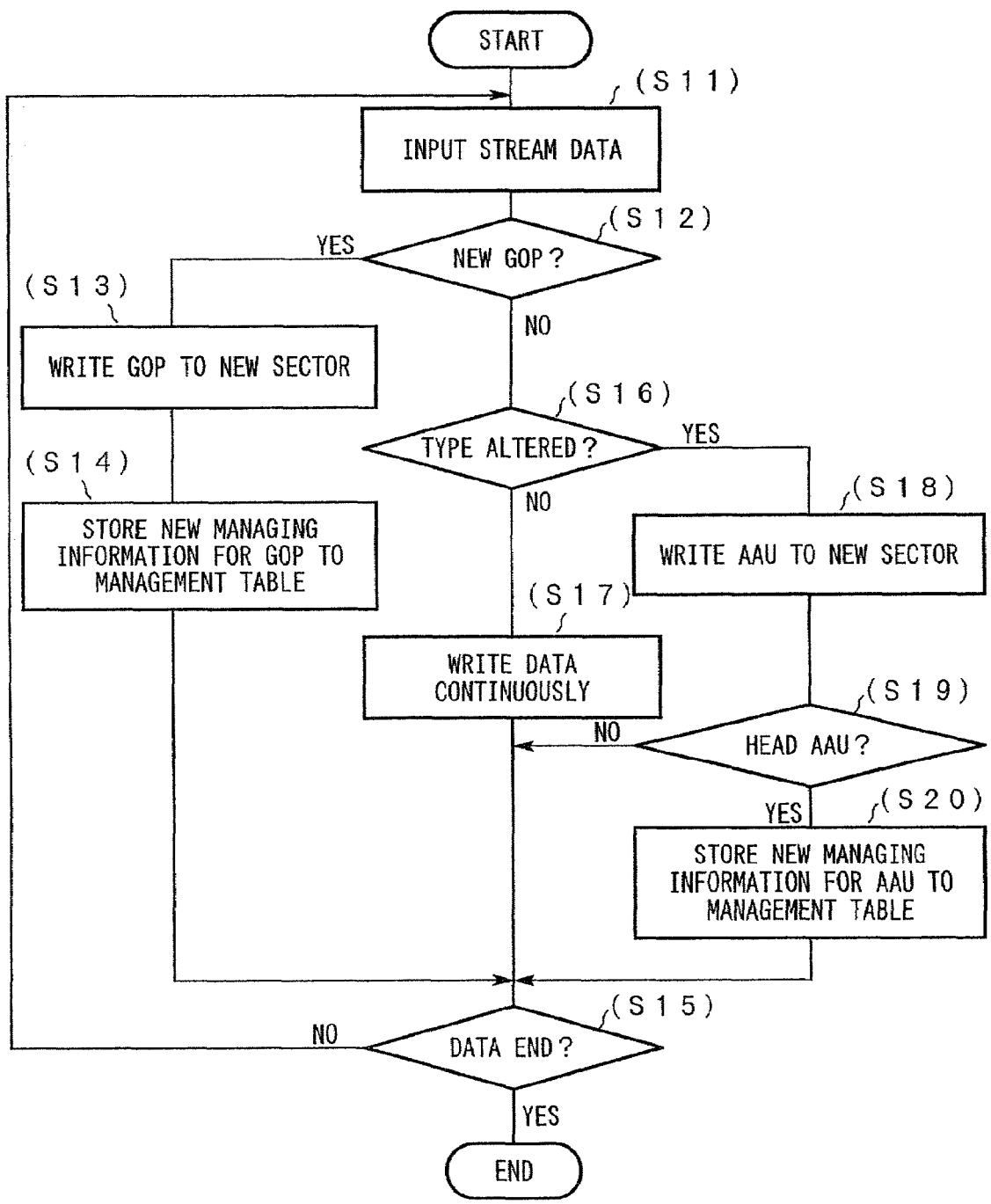
FIG. 5 is a flowchart showing a stream data storing process.
Figure 6:
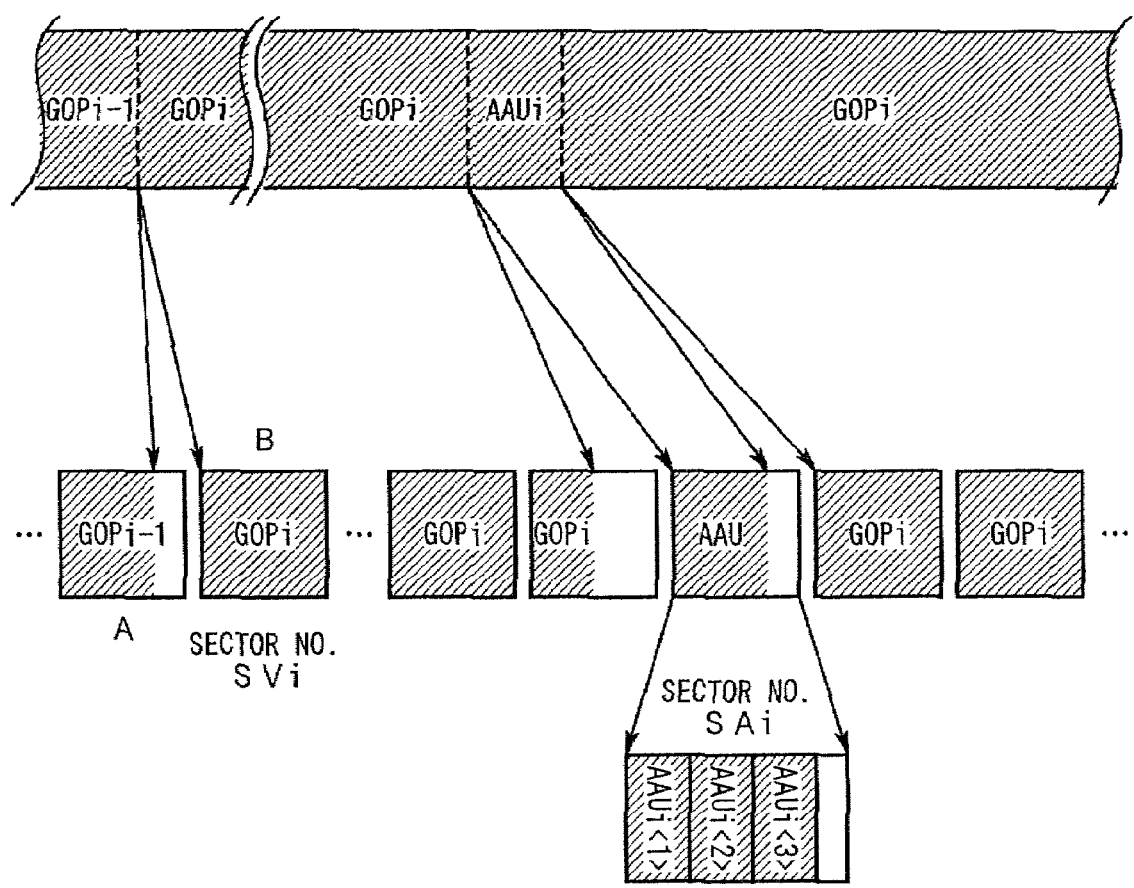
FIG. 6 illustrates how an MPEG system stream is stored.

FIG. 5 is a flowchart showing a stream data writing process. FIG. 6 illustrates how stream data is stored. FIGS. 7A and 7B show exemplary management tables. FIG. 4, along with FIGS. 5 through 7 will be referred to in the following descriptions.

When $GOP_i$ (ith GOP) is input after $GOP_{i-1}$ ((i-1)th GOP) as shown in FIG. 6 (step S11), the GOP detecting section 218 of the boundary detecting section 215 shown in FIG. 4 informs the write controlling section 212 that the head of a GOP is detected. In response, the write controlling section 212 judges that a new GOP has been input and makes an affirmative judgment at step S12.

First, the write controlling section 212 writes, through a disc controlling part 213, meaningless data (described later) to a free portion remaining in the sector to which data is being written. Then, the write controlling section 212 writes the new GOP a new sector from its head (step S13).

For example, when $GOP_{i-1}$ is being written to part (hatched in FIG. 6) of sector A in FIG. 6, the write controlling section 212 writes stuffing bytes or a padding stream that are predetermined as meaningless data in the MPEG scheme to the available area to make all the area of this sector a written area and writes the new $GOP_i$ from to the next sector (shown by symbol B in FIG. 6) from its head.

The functions of the vacant area detecting part and the sector stuffing part that were described above in the principles section are realized by the write controlling section 212's operating in the above described manner in response to a notice from the GOP detecting section 218.

At this time, operating in response to an instruction from the write controlling section 212, the managing information generating section 216 stores, in the management table 217, as part of managing information, a sector number indicating the sector to which the new GOP was written at step S13 (step S14).

Part of the functions of the sample collecting part 14 shown in FIG. 1 are realized by the managing information generating section 216's operating in response to an instruction from the write controlling section 212. For example, when $GOP_i$ that is contained in the MPEG system stream shown in FIG. 6 is written, a sector number $SV_i$ indicating a sector to which the head of $GOP_i$ has been written is collected as video data locating information and stored in the management table 217 in a manner shown in FIG. 7A.

Then, at step S15 in FIG. 5, it is judged whether the stream data to be written has ended. If the judgment result is negative, the process returns to step S1 to continue the stream data write processing.

For example, when data belonging to $GOP_i$ continues to be input as shown in FIG. 6, a negative judgment is made at step S16 and the process goes to step S17, where the write controlling section 212 writes the input stream data so that it is located immediately after the preceding data.

On the other hand, for example, if an AAU come in the midst of the data constituting $GOP_i$ (see FIG. 6), in response to a notice from the alternation detecting section 220 shown in FIG. 4 the write controlling section 212 judges that the type of data has changed (i.e., an affirmative judgment is made at step S16) and writes the AAU to new sectors in the same manner as done in step S13 (step S18).

At this time, the write controlling section 212 judges whether the stream data that has been written at step S18 is the head AAU of an AAU group that is a series of AAUs corresponding to the GOP that is being written (step S19). If the judgment result is negative, the process goes to step S15.

For example, if informed by the AAU detecting section 219 shown in FIG. 4 that an AAU head has been detected first after the start of input of the GOP that is being written, the write controlling section 212 judges that this AAU is the head AAU corresponding to the GOP that is being written (i.e., an affirmative judgment is made at step S19).

Part of the functions of the type-boundary detecting part 32 shown in FIG. 1 are realized by the write controlling section 212's operating in response to a notice from the AAU detecting section 219 in the above-described manner.

For example, if $AAU_i<1>$ that is contained in a series of AAUs (indicated by $AAU_i$ in FIG. 6) corresponding to $GOP_i$ is input after part of $GOP_i$, first, processing of separating a write destination sector is performed in response to the data type change from GOP to AAU and the input $AAU_i<1>$ is written to a new sector (see FIG. 6).

Since $AAU_i<1>$ is the head AAU corresponding to the GOP that is being written, an affirmative judgment is made at step S19. The managing information generating section 216 operates in response to an instruction from the write controlling section 212, and thereby realizes part of the functions of the sample collecting part 14 shown in FIG. 1. As a result, a sector number $SA_i$ indicating this sector is stored in the management table 217 in a manner shown in FIG. 7A.

As described above, the write controlling section 212 controls the stream data write operation in accordance with a detection result of the boundary detecting section 215, GOPs and AAUs can be recorded in the hard disc drive 214 in such a manner that the head of each GOP and the head of the head AAU corresponding to each GOP are stored at the heads of sectors as shown in FIG. 6.

Alternatively, instead of collecting sector numbers, the managing information generating section 216 shown in FIG. 4 may collect addresses $AV_i$(i=1 to n) and $AA_i$(i=1 to n) indicating sectors and time stamps $TP_i$(i=1 to n) and $TA_i$(i=1 to n) that are given to respective GOPs and corresponding head AAUs (see FIG. 7B). In this case, a management table as shown in FIG. 7B can be generated and used for replay processing and edit processing (described later).

Next, a description will be made of a method for freely replaying stream data recorded as described above on a storage medium using managing information that is stored in the management table 217.

In the stream data recording and replaying system shown in FIG. 4, in response to an instruction from a replay controlling section 222, a data reading section 221 reads specified stream data from the hard disk drive 214 via the disc controlling device 213 and subjects it to processing of an audio-video replaying section 424.

On the other hand, a replay instruction that is input through an input device 223 shown in FIG. 4 is analyzed by a replay instruction analyzing section 224 and the replay controlling section 222 controls the operation of the data reading section 221 in accordance with analysis results.

Receives information indicating a replay starting point from the replay instruction analyzing section 224, a starting point finding section 225 shown in FIG. 4 determines a proper sector number based on this information and the managing information held by the management table 217 and informs the replay controlling section 222 about it.

Figure 8:
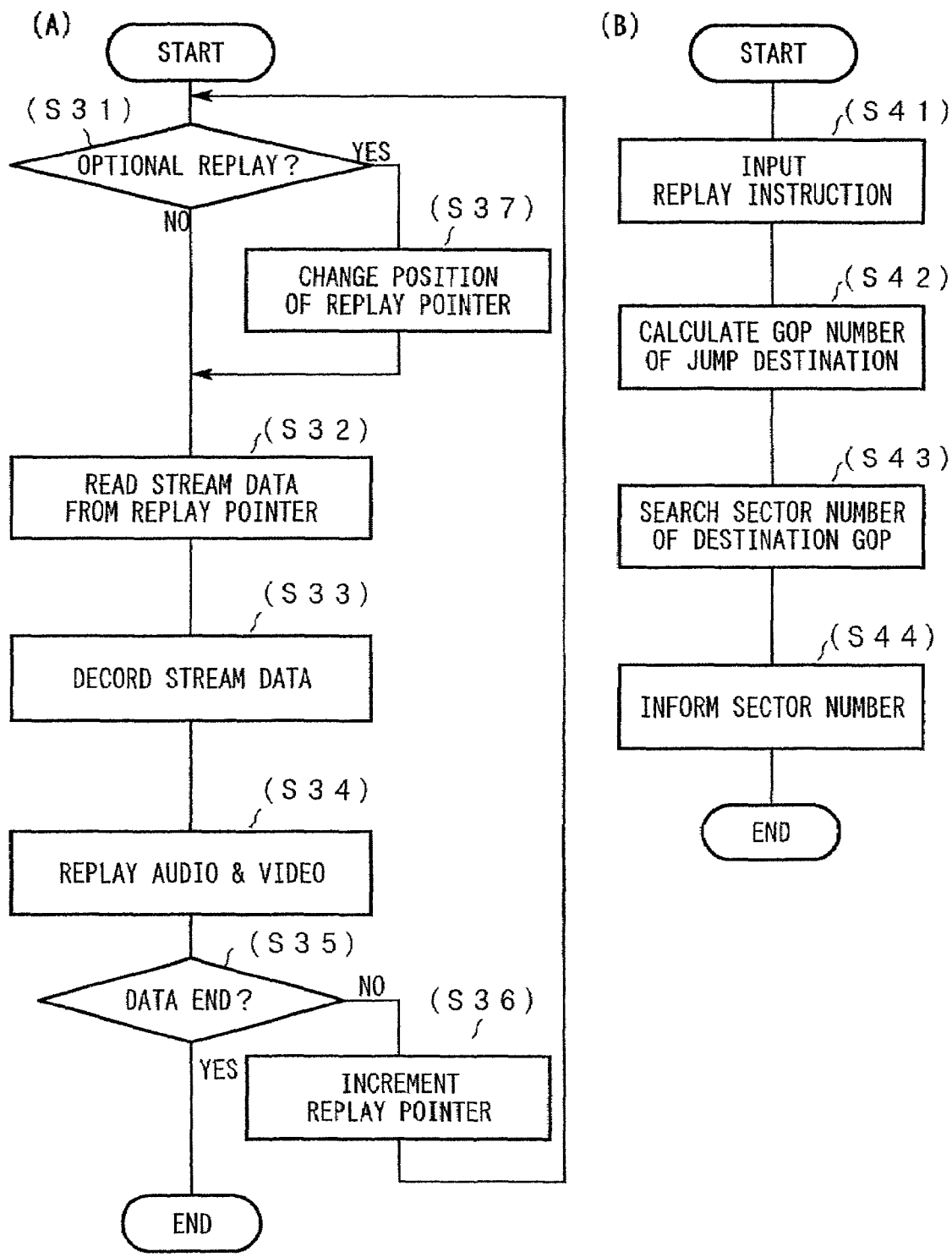
FIGS. 8A and 8B are flowcharts showing a stream data replaying process.

FIGS. 4 and 8 will be referred to in the following descriptions. FIGS. 8A and 8B are flowcharts showing a stream data replaying process.

If no optional replay instructions (described later) are input through the input device 223 shown in FIG. 4 (a negative judgment is made at step S31 in FIG. 8A), the stream data recorded in the hard disk drive 214 is read sequentially by the data reading section 221 in response to an instruction from the replay controlling section 222 (step S32) and decoded by the audio-video replaying section 424 (step S33).

A display device 429 and a speaker 430 replay (output) decoded data (step S34) and video and audio are provided to a user. If the stream data continues (a negative judgment is made at step S35), the position of a replay pointer is advanced to the next sector at step S36 and the process returns to step S31 to replay the following part of the data stream.

On the other hand, if a skip run instruction to the effect that replaying of stream data of a specified time should be skipped and the following stream data should be replayed is made, the replay controlling section 222 makes an affirmative judgment at step S31 in accordance with analysis results of the replay instruction analyzing section 224 and the process goes to step S37.

In this case, as shown in FIG. 8B, the replay instruction analyzing section 224 receives and analyzes the input replay instruction (step S41) and informs the replay controlling section 222 that a skip run instruction has been made (analysis result). The replay instruction analyzing section 224 passes, as specifying information, a skip time Ts that is specified by the replay instruction to the starting point finding section 225.

In response, the starting point finding section 225 calculates a jump destination GOP number based on a GOP number of the GOP being replayed and the above-mentioned skip time Ts (step S42).

Then, the starting point finding section 225 searches the management table 217 for sector numbers of sectors where the head of the GOP concerned and the head AAU corresponding to this GOP are stored based on the calculated GOP number (step S43) and informs the replay controlling section 222 about the sector numbers thus found (step S44). The analyzing process relating to the optional replay instruction is finished here.

The replay controlling section 222 changes the position of the replay pointer based on the sector numbers thus informed of (step S37). The process goes to step S32 to replay the stream data in the same manner as in ordinary cases.

As described above, the replay instruction analyzing section 224, the starting point finding section 225, and the replay controlling section 222 operate in accordance with an optional replay instruction that is input through the input device 223, whereby the functions of the starting point retrieving part 21 and the replaying part 22 shown in FIG. 2 can be realized.

In this manner, in response to a replay instruction specifying arbitrary GOP contained in the stream data, video and audio corresponding to GOPs that follow the specified GOP and AAUs corresponding to the GOPs can be replayed as desired.

In the MPEG scheme, time that is taken to replay one GOP is as short as 0.5 sec.

Therefore, by making it possible to control a stream data replay operation on a GOP-by-GOP basis in the above-described manner, a stream data replaying apparatus can be realized that can replay video and audio as desired and provide those to a user without being restricted by the time-series nature of stream data.

Embodiment 2

Figure 9:
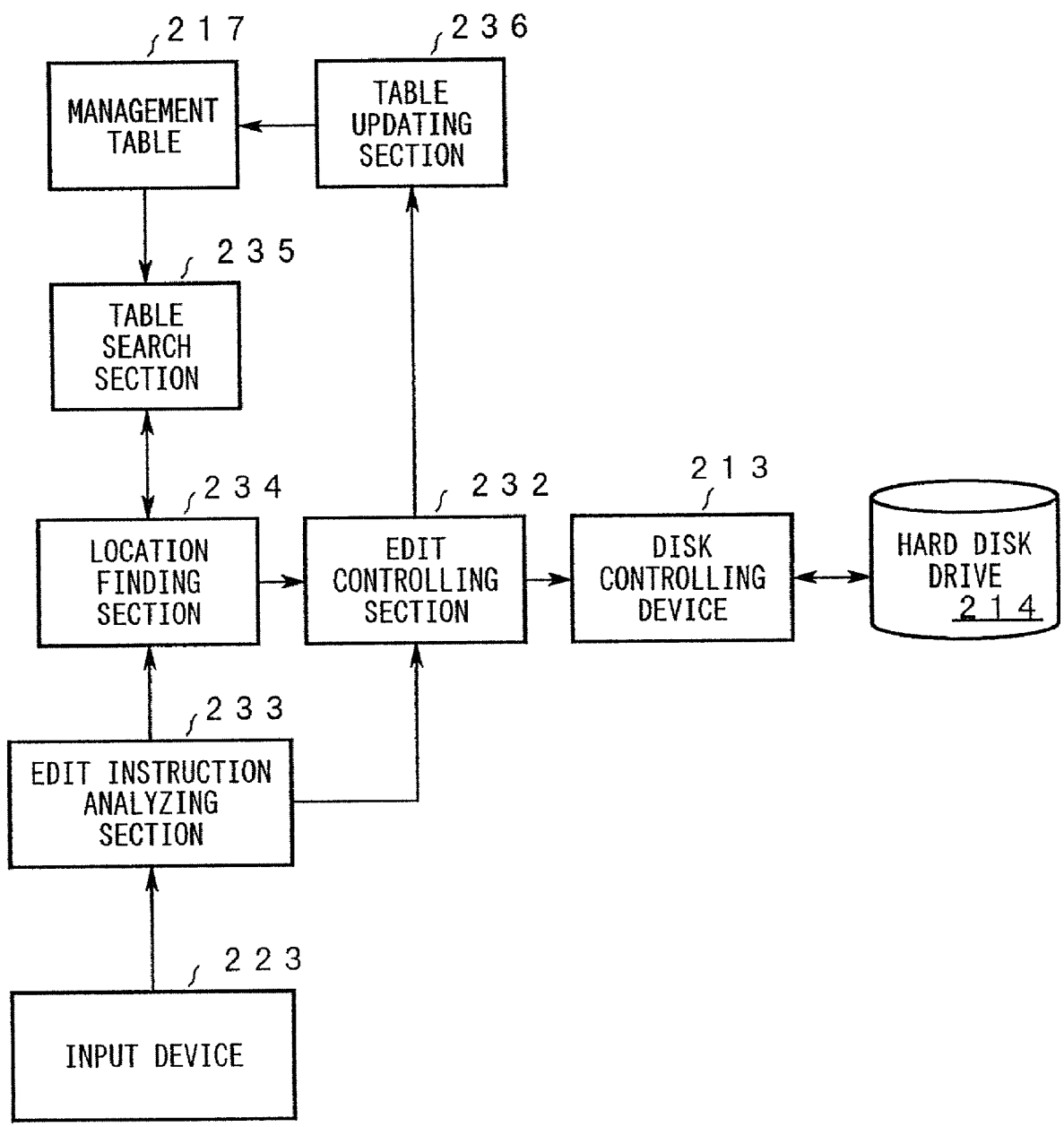
FIG. 9 shows a stream data editing apparatus according to a second embodiment of the invention.

FIG. 9 shows a stream data editing apparatus according to a second embodiment of the invention.

In the stream data editing apparatus shown in FIG. 9, an edit instruction that is input through an input device 223 is analyzed by an edit instruction analyzing section 233. Based on analysis results and managing information held by a management table 217, a location finding section 234 and a table search section 235 determines a storage area of the storage media of a hard disk drive 214 in accordance with a range specified by the edit instruction. The storage area thus determined is used for an edit manipulation by an edit controlling section 232.

The edit controlling section 232 performs edit processing on stream data by controlling the operation of a disk controlling device 213 based on the storage area determined by the location finding section 234 and the analysis results of the edit instruction analyzing section 233. Further, the edit controlling section 232 reflects on the management table 217, via a table updating section 236, editing results of the edit processing.

Figure 10:
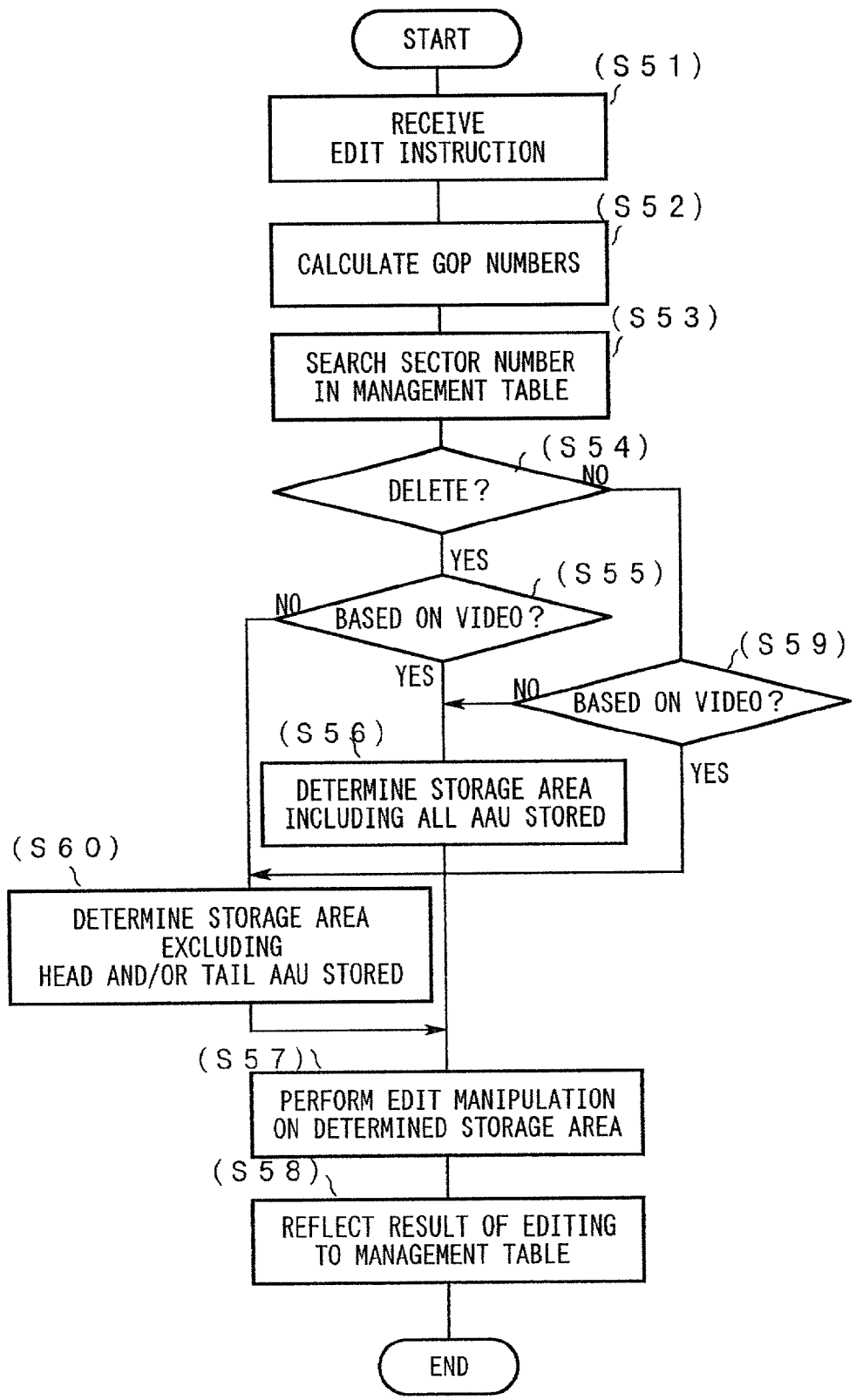
FIG. 10 is a flowchart showing a stream data editing process.

FIG. 10 is a flowchart showing a stream data editing process.

The edit instruction analyzing section 233 receives an edit instruction that is input through the input device 223 and analyses it to find range information indicating a range specified by the same (step S51), and supplies the location finding section 234 with this information. At this time, the edit instruction analyzing section 233 passes information indicating a manipulation to be performed on data in this range to the edit controlling section 232.

There is a possibility that a case occurs where a replay time of video of each GOP does not completely coincide with that of audio of a series of AAUs corresponding to the GOP, depending on how to determine a head AAU corresponding to each GOP.

Figure 11:
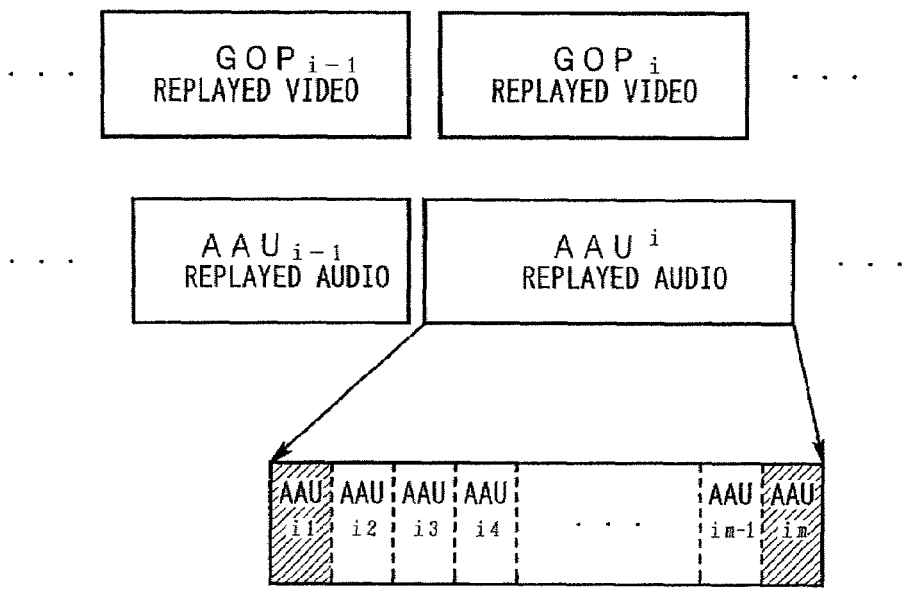
FIGS. 11A-11C illustrate how a stream data editing operation is performed.
Figure 11:
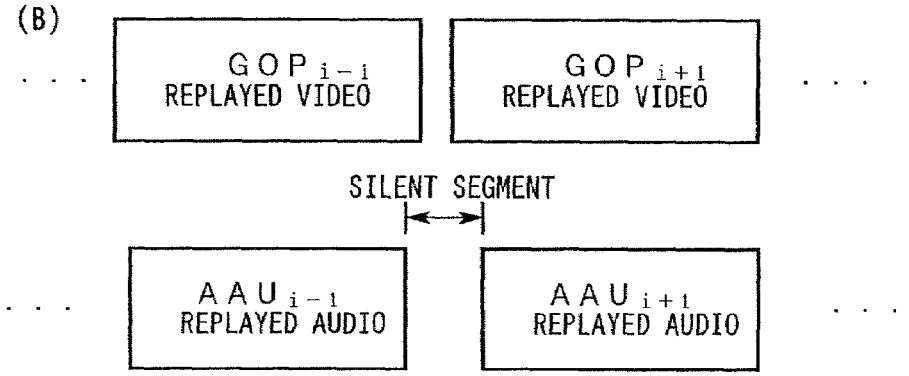
Figure 11:
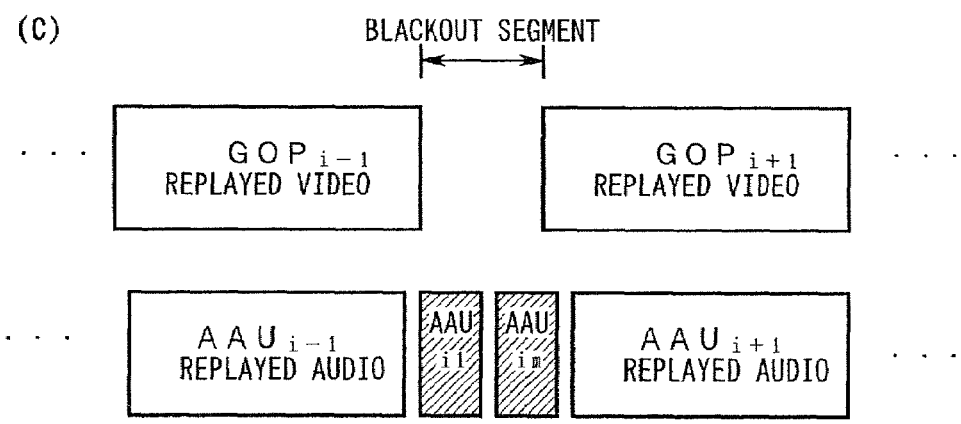

For example, as hatched in FIG. 11A, there may occur a case that an AAU group consisting of AAUs (denoted by $AAU_j$ in FIG. 11A) are regarded as corresponding to $GOP_i$ (ith GOP) contains an AAU representing audio that should be replayed together with last several frames of $GOP_{i-1}$ or an AAU representing audio that should be replayed together with first several frames of $GOP_{i+1}$.

By specifying, in view of the above, by means of an edit instruction, which of video information and audio information should be used as a reference in deleting or cutting out stream data, editing processing can be realized as described later in which priority is given to video information or audio information in accordance with the preference of a user.

For example, if an edit instruction to the effect that video and audio of S1 sec from a time point that is separated from the head of stream data by a time T1 should be deleted with the video used as a reference is input, first the location finding section 234 calculates GOP numbers corresponding to the head and the tail of the range indicated by the above range information (step S52). Based on the GOP numbers thus obtained, the table search section 235 retrieves corresponding sector numbers from the management table 217 (step S53).

In this case, deletion is specified as an edit manipulation and the instruction to the effect that video should be used as a reference is made. Therefore, affirmative judgments are made at steps S54 and S55 and the process goes to step S56.

Based on the sector numbers received from the table search section 235, the location finding section 234 determines an area of the storage media where all GOPs indicated by the GOP numbers obtained at step S52 are stored and areas of the storage media where AAUs belonging to AAU groups corresponding to those GOPs are stored. The location finding section 234 determines those areas as subjects of the edit manipulation (step S56).

The location finding section 234 and the table search section 235 operate in the above-described manner in accordance with analysis results of the edit instruction analyzing section 233, whereby the functions of the distribution information retrieving part 26 and the target determining part 27 shown in FIG. 2 are realized. As a result, a storage area of the storage media corresponding to a range of stream data specified by an edit instruction can be determined and used for processing of the edit controlling section 232.

Then, the edit controlling section 232 performs the edit manipulation (e.g., deletion) specified by the edit instruction on the storage areas that have been determined as the subjects of the edit manipulation (step S57). The table updating section 236 reflects results of the edit manipulation (step S58), on the managing information held by the management table 217.

For example, if an instruction to delete data in the above-mentioned range is made, the table updating section 236 deletes elements of the management table 217 corresponding to the GOPs indicated by the GOP numbers that were obtained at step S52.

The function of the result reflecting part 29 shown in FIG. 2 can be realized by the table-updating section 236's manipulating the contents of the management table 217 in the above-described manner in accordance with an instruction from the edit controlling section 232.

As described in the above example, when areas as subjects of deletion are determined with video used as a reference, there is a possibility that not only AAUs as coded data corresponding to audio that should be replayed together with video corresponding to GOPS as an edit subject but also a few AAUs as coded data of audio that should be replayed together with several frames located at the tail of the immediately preceding GOP and/or a few AAUs as coded data of audio that should be replayed together with several frames located at the head of the immediately following GOP are deleted by deletion processing. Therefore, when edited stream data is replayed, short silent segments may occur before and/or after the edited portion.

However, since the replay time of audio corresponding to one AAU is very short, silent segments that occur when edited stream data is replayed are also very short. That is, such silent segments are short enough to be neglected unless a user requires very strict editing results.

If an AAU group corresponding to each GOP is determined strictly with replay times of each GOP and each AAU constituting stream data taken into consideration, the lengths of silent segments as described above can be made almost equal to zero and ripping errors can be avoided almost completely.

On the other hand, for example, if an edit instruction to the effect that video and audio of S2 sec from a time point that is separated from the head of stream data by a time T2 should be cut out with the video used as a reference and moved to a specified position is input, necessary sector numbers are obtained at steps S52 and S53 in the same manner as in the above example and a negative judgment is made at step S54, whereupon the process goes to step S59. Since the use of video as a reference is specified, an affirmative judgment is made at step S59 and the process goes to step S60.

At step S60, the location finding section 234 determines, in the same manner as does at step S56 in the above example, an area of the storage media where all GOPs indicated by the GOP numbers obtained at step S52 are stored and areas of the storage media where AAUs belonging to AAU groups corresponding to those GOPs excluding an appropriate number of head AAUs and an appropriate number of tail AAUs are stored. The location finding section 234 determines those areas as subjects of the edit manipulation. The process then goes to step S57.

The function of the target determining part 27 that was described above as the principle of the third target determining part with reference to FIG. 2 is realized by the location finding section 234's operating in accordance with analysis results of the edit instruction analyzing section 233 in the above-described manner. Audio data corresponding to scenes before and after a range of stream data as a subject of movement or copying can be removed reliably from the subject range.

The edit controlling section 232 performs the edit manipulation (e.g., movement) indicated by the analysis results of the edit instruction analyzing section 233 on the thus-determined subjects of the edit manipulation (step S57), and updates the management table 217 via the table updating section 236 (step S58) to reflect changes in the storage locations of the stream data caused by the edit manipulation, on the management table 217.

On the other hand, if an edit instruction to the effect that a specified range should be deleted with audio used as a reference is made, a negative judgment is made at step S55 and the process goes to step S60. At step S60, AAUs that may correspond to a GOP before or after the specified range are separated and ranges excluding those AAUs are determined as subjects of the deletion.

If an edit instruction to the effect that a specified range should be cut out with audio used as a reference is made, a negative judgment is made at step S59 and the process goes to step S56. At step S56, ranges where all GOPs contained in the specified range and all AAUs belonging to AAU groups corresponding to those GOPs are determined as subjects of the edit manipulation based on the managing information held by the management table 217.

Therefore, when part of stream data is deleted or cut out with audio used as a reference, there is a possibility that ripping errors occur that are opposite to those that would occur when video is used as a reference.

For example, as shown in FIG. 11C, there may occur a case that AAUs (hatched in FIG. 11C) that were excluded from edit ranges remain in a portion that is left after deletion of edit subject portions of stream data, to cause segments (blackout segments) where only audio is replayed without being accompanied by video.

However, as mentioned above, since the replay time of one AAU is very short, such blackout segments last only very short times. That is, such blackout segments cause any problems unless a user requires editing results of an extremely high level. Even such ripping errors can be avoided almost completely by determining an AAU group corresponding to each GOP strictly.

As described above, in the stream data editing apparatus according to this embodiment, MPEG system stream data can be edited freely on a GOP-by-GOP basis in such a manner as to be kept digital. Therefore, MPEG system stream data can be edited very easily by taking advantage of the fact that it is stored in randomly accessible storage media.

This is for the following reasons. First, stream data that was produced by MPEG compression coding is much smaller in size than data necessary to replay analog video and audio. Second, dispensing with processing of encoding analog video and audio again makes it unnecessary to prepare a large-capacity storage device and encoders.

An edit manipulation on MPEG system stream data that was recorded by the stream data recording apparatus according to the invention can be performed in such a manner that video and audio are separated from each other easily, because digital video information and digital audio information are recorded separately on the storage media of the hard disk drive 214 as shown in FIG. 6.

Embodiment 3

Figure 12:
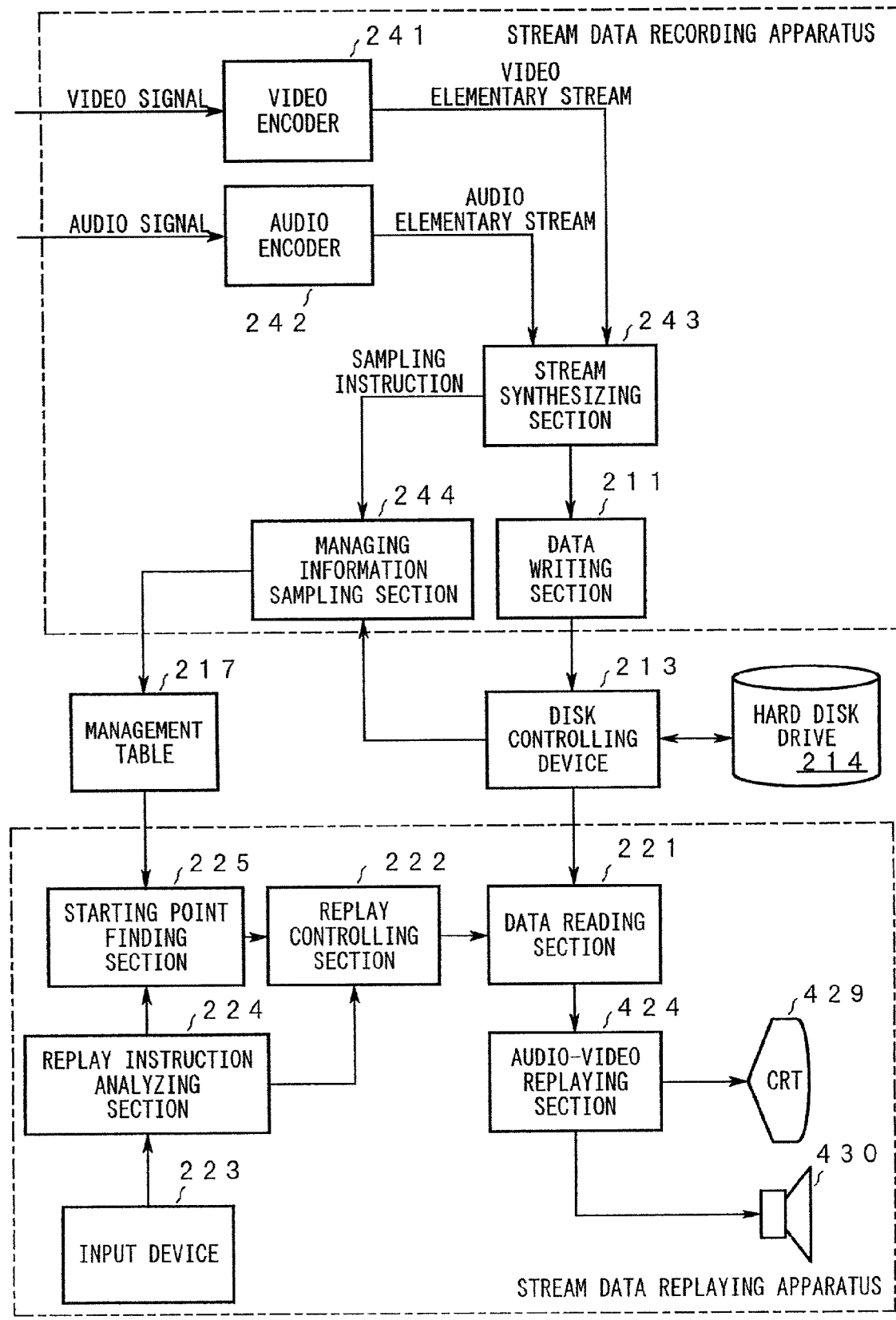
FIG. 12 shows the configuration of a stream data recording and replaying system, that is, a stream data recording apparatus and a stream data replaying apparatus, according to a third embodiment of the invention.

FIG. 12 shows the configuration of a stream data recording and replaying system, that is, a stream data recording apparatus and a stream data replaying apparatus, according to a third embodiment of the invention.

In the stream data recording and replaying system shown in FIG. 12, an input analog video signal and analog audio signal are compression-coded by a video encoder 241 and an audio encoder 242, respectively, and a resulting video elementary stream and audio elementary stream are input to a stream synthesizing section 243.

The stream synthesizing section 243 combines the video elementary stream and the audio elementary stream in a manner described later, and a resulting MPEG system stream is input to a data writing section 211.

The video encoder 241, the audio encoder 242, and the stream synthesizing section 243 constitute the stream data input part 12 of the stream data recording apparatus shown in FIG. 1. An MPEG system data stream generated by the operation of these sections is stored in a hard disk drive 214 via the data writing section 211 and a disk controlling device 213 and will be subjected to replay processing of the stream data replaying apparatus.

In the stream data recording apparatus shown in FIG. 12, a managing information sampling section 244 performs a sampling operation (described later) in response to a sampling instruction from the stream synthesizing section 243 and stores obtained managing information in a management table 217.

Figure 13:
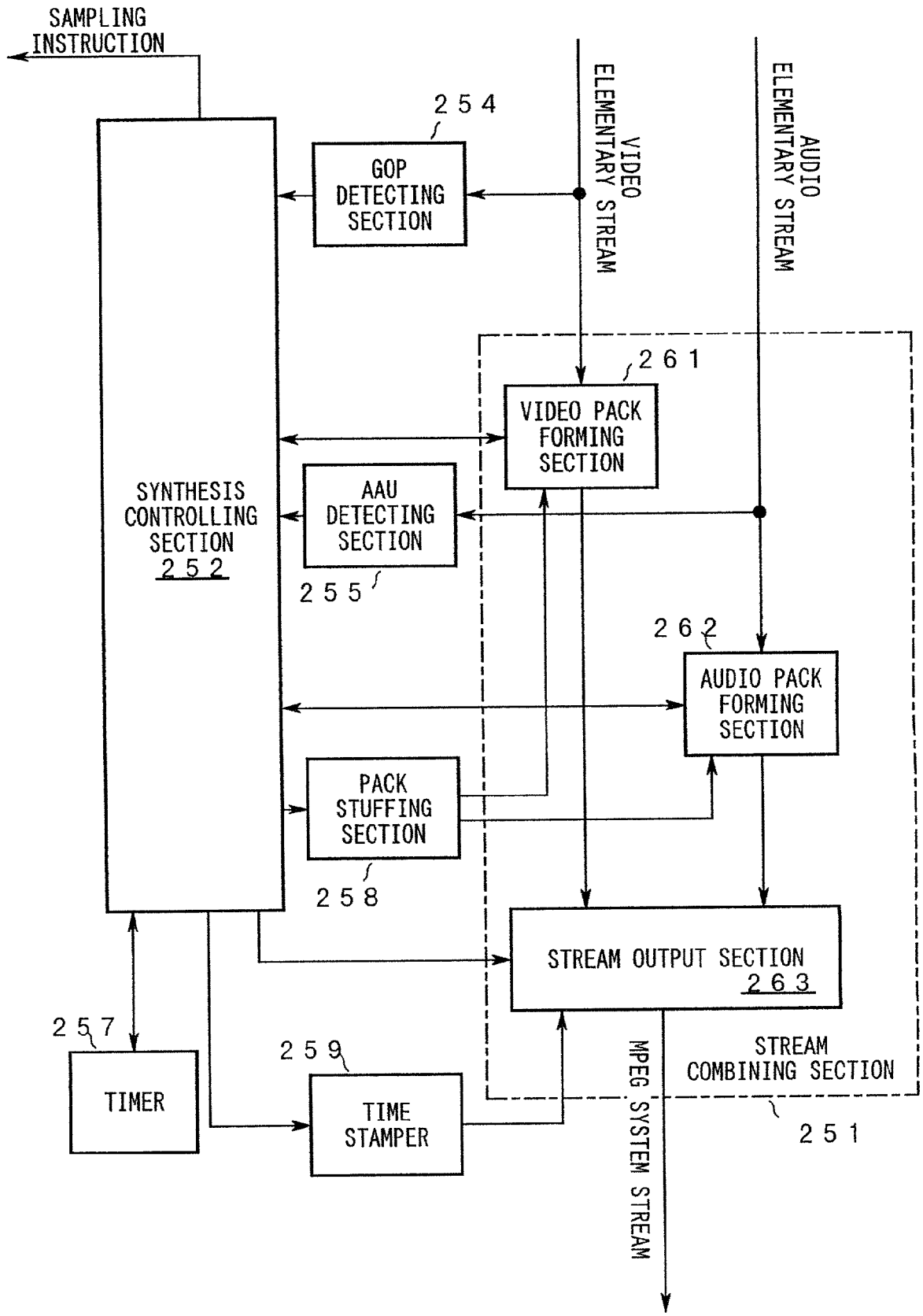
FIG. 13 shows a detailed configuration of a stream synthesizing section.

FIG. 13 shows a detailed configuration of the stream synthesizing section 243.

In the stream synthesizing section 243 shown in FIG. 13, a video elementary stream and an audio elementary stream are input to a stream combining section 251, which forms an MPEG system stream by combining the elementary streams by performing packing processing (described later) in response to an instruction from a synthesis controlling section 252.

In FIG. 13, the synthesis controlling section 252 controls the operation of the stream combining section 251, a pack stuffing section 258, and a time stamper 259 in a manner described later based on notices from a GOP detecting section 254, an AAU detecting section 255, and a timer 257. At this time, the synthesis controlling section 252 generates a sampling instruction when necessary and supplies it to the managing information sampling section 244 shown in FIG. 12.

In the stream combining section 251 shown in FIG. 13, a video pack forming section 261 and an audio pack forming section 262 operate parallel in response to instructions from the synthesis controlling section 252 and encapsulate a received video elementary stream and audio elementary stream into video packs and audio packs, respectively, having a capacity that is equal to the sector size of the hard disk drive 214.

On the other hand, in the stream combining section 215, a stream output section 263 forms an MPEG system stream by outputting the video packs and the audio packs in order in response to an instruction from the synthesis controlling section 252 and an output request to the effect that video packs or audio packs should be output.

Figure 14:
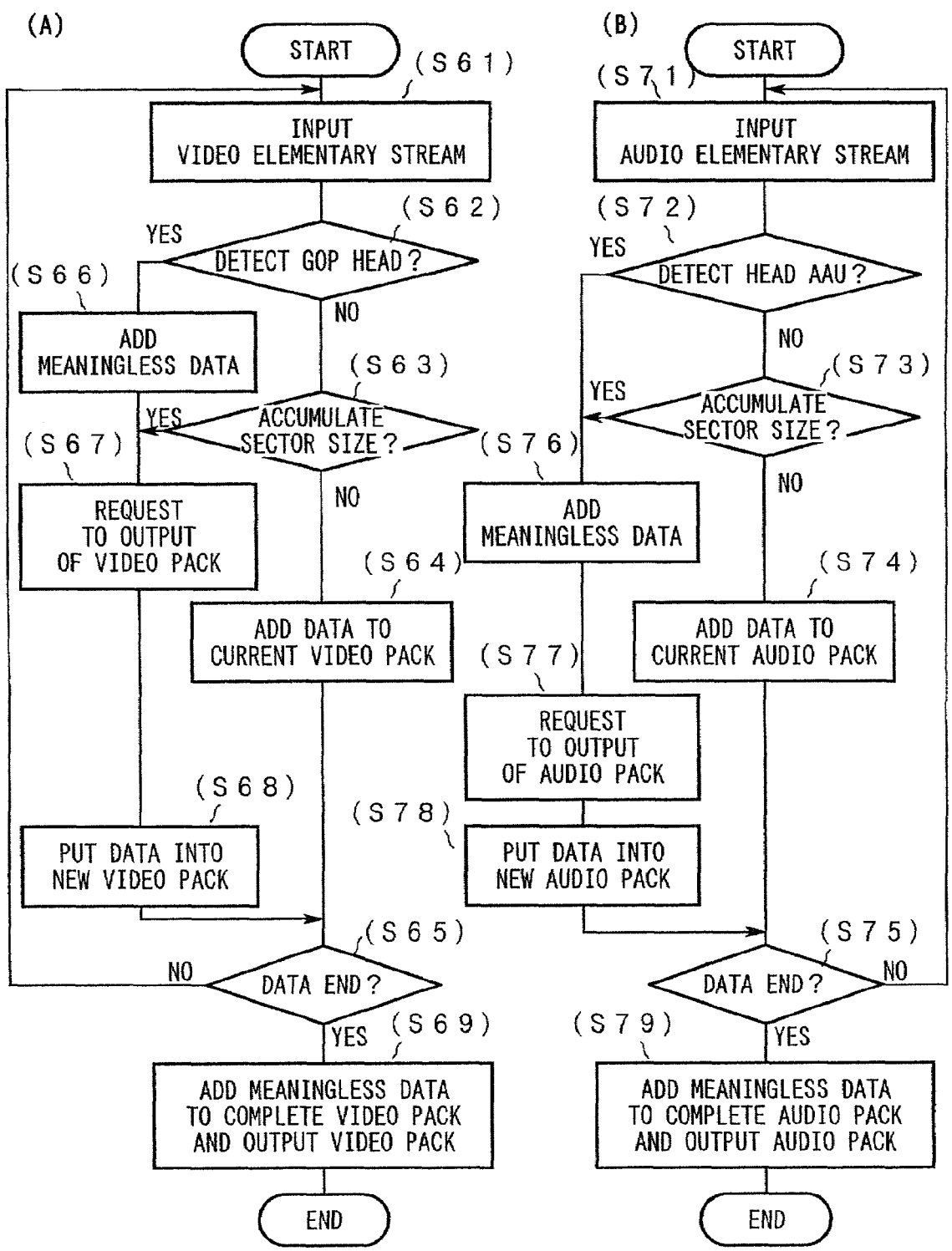
FIGS. 14A and 14B are flowcharts showing processes of encapsulating a video elementary stream and an audio elementary stream, respectively.
Figure 15:
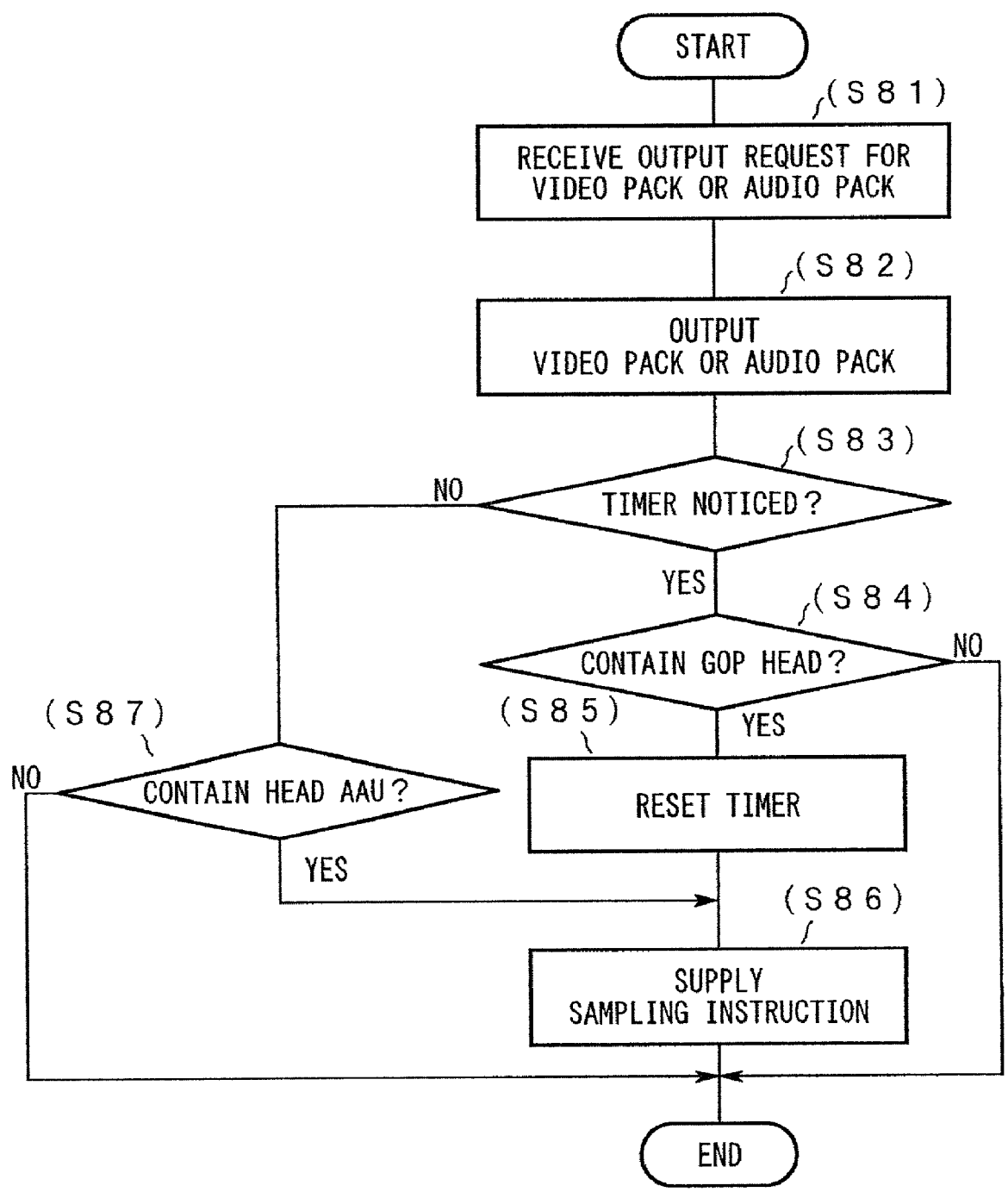
FIG. 15 is a flowchart showing an MPEG system stream output process.

FIGS. 14A and 14B are flowcharts showing processes of encapsulating a video elementary stream and an audio elementary stream, respectively. FIG. 15 is a flowchart showing an MPEG system stream output process.

Figure 16:
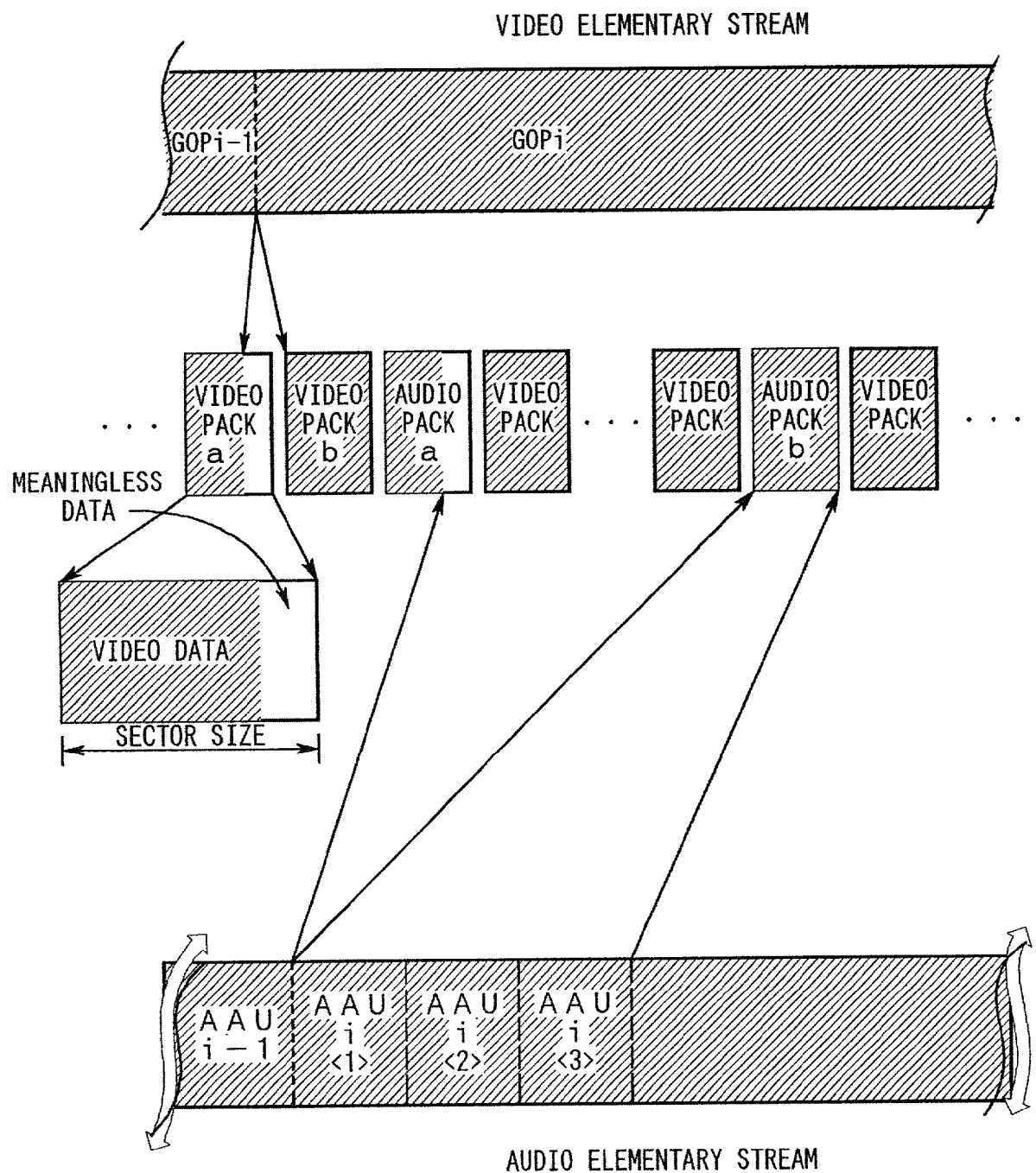
FIG. 16 illustrates how an MPEG system stream is formed.

FIG. 16 illustrates how an MPEG system stream is formed.

For example, when part of an (i−1)th GOP is being input to the video pack forming section 261 (see FIG. 13) as video elementary stream data as shown in FIG. 16 (step S61), the synthesis controlling section 252 makes a negative judgment at step S62 and makes a transition to step S63, where the synthesis controlling section 252 judges whether video elementary stream data have been accumulated by the sector size.

If a negative judgment is made at step S63, the video pack forming section 261 adds the video elementary stream data that was input at step S61 to the video pack being formed (step S64). Then, the synthesis controlling section 252 judges whether the video elementary stream has ended (step S65).

If a negative judgment is made at step S65, the process returns to step S61, where the video pack forming section 261 performs packing processing on new video elementary stream data.

When a head portion of $GOP_i$ (ith GOP) is thereafter input to the video pack forming section 261 as video elementary stream data, the synthesis controlling section 252 makes an affirmative judgment at step S62 in response to a notice from the GOP detecting section 254 and starts processing of putting the current and subsequent stream data into another video pack.

First, in response to an instruction from the synthesis controlling section 252, the pack stuffing section 258 fills the remaining capacity of the video pack being formed (indicated as a video pack a in FIG. 16), with meaningless data as shown in FIG. 16 (step S66).

Then, in response to an instruction from the synthesis controlling section 252, the video pack forming section 261 passes the meaningless-data-added video pack to the stream output section 263 and requests the synthesis controlling section 252 to cause output of the video pack (step S67). Then, newly input video elementary stream data is put into a new video pack as shown in FIG. 16 (step S68) and the process goes to step S65.

Parallel with the above operation of the video pack forming section 261, the audio pack forming section 262 performs an audio elementary stream encapsulating operation as shown in FIG. 14B.

For example, when part of an AAU group (denoted by $AAU_{i-1}$ in FIG. 16) consisting of AAUs corresponding to $GOP_{i-1}$ is being input to the audio pack forming section 262 (see FIG. 13) as audio elementary stream data as shown in FIG. 16 (step S71), a negative judgment is made at step S72 and the process goes to step S73, where it is judged whether audio elementary stream data have been accumulated by the sector size.

If a negative judgment is made at step S73, the audio pack forming section 262 adds the audio elementary stream data that was input at step S71 to the audio pack being formed (step S74). Then, it is judged whether the audio elementary stream has ended (step S75).

If a negative judgment is made at step S75, the process returns to step S71, where the audio pack forming section 262 performs an encapsulating process on new audio elementary stream data.

When a first $AAU_i<1>$ belonging to an AAU group (denoted by $AAU_i$ in FIG. 16) corresponding to $GOP_i$ is thereafter input to the audio pack forming section 262 as audio elementary stream data, the synthesis controlling section 252 makes an affirmative judgment at step S72 in response to a notice from the MU detecting section 255 and starts processing of putting the current and subsequent stream data into another video pack.

In response to an instruction from the synthesis controlling section 252, the pack stuffing section 258 fills, as described in the above video pack forming process, the remaining capacity of the audio pack being formed (indicated as an audio pack a in FIG. 16) with meaningless data (step S76).

Then, in response to an instruction from the synthesis controlling section 252, the audio pack forming section 262 requests the synthesis controlling section 252 to cause output of the audio pack in the same manner as in step S68 (step S77). Then, newly input audio elementary stream data (denoted by symbols <1>, <2>, and <3> in FIG. 16) are put into a new audio pack (step S78) and the process goes to step S75.

When receiving a video pack output request or an audio pack output request during the above encapsulating processing (step S81 in FIG. 15), the synthesis controlling section 252 starts an output control operation. In response to an instruction from the synthesis controlling section 252, the stream output section 263 outputs, as it is, the pack as the subject of the output request (step S82).

At this time, the time stamper 259 generates a time stamp indicating present time in response to an instruction form the synthesis controlling section 252 and passes it to the stream output section 263. The stream output section 263 adds the time stamp to the header of the video pack concerned and outputs the video pack thus processed.

Then, the synthesis controlling section 252 judges, based on a notice from the timer 257, whether it is time to sample managing information (step S83). If the judgment result is affirmative, the synthesis controlling section 252 judges, based on a notice from the GOP detecting section 254, whether the pack that was output at step S82 contains a GOP head portion (step S84).

For example, the synthesis controlling section 252 operate as later shown in response to an output request for a video pack b (see FIG. 16) that contains a head portion of $GOP_i$ (ith GOP), when the outputting and controlling the video pack is under way. When informed by the timer 257 that an appropriate time has elapsed, the synthesis controlling section 252 causes the stream output section 263 to output the video pack b as part of the MPEG system stream (see FIG. 16). Then, the synthesis controlling section 252 makes an affirmative judgment at step S83 and makes a transition to step S84, where the synthesis controlling section 252 judges that the GOP concerned is a sampling GOP that is a subject of sampling of managing information (affirmative judgment at step S84).

The synthesis controlling section 252 resets the timer 257 (step S85), and supplies a sampling instruction to the managing information sampling section 244 shown in FIG. 12 (step S86). The process is finished here.

On the other hand, if the synthesis controlling section 252 has not received a notice from the timer 257 when it receives a video pack output request or an audio pack output request, the synthesis controlling section 252 makes a negative judgment at step S83 and judges whether the subject of the output request contains a head AAU corresponding to the sampling GOP (step S87).

For example, when the synthesis controlling section 252 starts an output control operation in response to an output request for an audio pack b that contains the head AAU ($AAU_i<1>$) corresponding to $GOP_i$ (see FIG. 16), the synthesis controlling section 252 judges that the audio pack concerned contains the head AAU (affirmative judgment at step S86) and makes a transition to step S86, where the synthesis controlling section 252 instructs the managing information sampling section 244 to sample managing information relating to the head AAU. The process is finished here. On the other hand, in the case of an audio pack that does not contain the head AAU, a negative judgment is made at step S86 and the process is finished.

As described above, the video pack forming section 261, the audio pack forming section 262, and the stream output section 263 operate in response to instructions from the synthesis controlling section 252, whereby the functions of the video pack forming part, the audio pack forming part, the packing controlling part, and the synthesizing part that were described in describing the principle of the stream data input part 12 are realized.

As a result, as shown in FIG. 16, processing of encapsulating a video elementary stream into packs having a capacity that is equal to the sector size of the hard disk drive 214 and processing of encapsulating an audio elementary stream into packs having the same capacity can be performed parallel and an MPEG system stream can be formed by the resulting video packs and audio packs.

The video pack forming section 261 encapsulates video elementary stream data into video packs in order as shown in FIG. 14A. When the tail of the video elementary stream is detected (affirmative judgment at step S65), the pack stuffing section 258 and the video pack forming section 261 operate in the same manner as in steps S66 and S67 in response to instructions from the synthesis controlling section 252, whereby meaningless data is added until the remaining capacity of the video pack being formed is full, to complete the video pack and the completed video pack is output (step S69). The encapsulating processing on the video elementary stream is finished here.

Similarly, when an affirmative judgment is made at step S75 shown in FIG. 14B, the pack stuffing section 258 and the audio pack forming section 262 operate in the same manner as in steps S76 and S77 in response to instructions from the synthesis controlling section 252, whereby meaningless data is added until the remaining capacity of the audio pack being formed is full, to complete the audio pack and the completed audio pack is output (step S79). The packing processing on the audio elementary stream is finished here.

As described above, the pack stuffing section 258, the video pack forming section 261, and the audio pack forming section 262 operate in response to instructions from the synthesis controlling section 252, whereby the functions of the video pack stuffing part and the audio pack stuffing part that were described in describing the principle of the third stream data input part are realized, whereby all video packs and audio packs can be filled reliably with data that can be processed normally by an audio-video replaying section 424 shown in FIG. 12.

In this case, in an MPEG system stream that is formed by the stream synthesizing section 243, the head of each GOP and the head AAU corresponding to each GOP are located at the heads of the video pack and the audio pack and the capacity of each video pack and each audio pack is equal to the sector size of the hard disk drive 214.

Therefore, by the data writing section 211's writing such an MPEG system stream to the hard disk drive 214 as it is, each GOP and the head AAU corresponding to each GOP can stored in the hard disk drive 214 from the heads of sectors.

Naturally, a configuration as described in the first embodiment is possible in which a data type change in an MPEG system stream is detected and in response the data writing section 211 writes stream data to new sectors in a divisional manner.

As shown in FIG. 15, the synthesis controlling section 252 operates in response to a notice from the timer 257, whereby instructions to sample managing information can be made selectively for sampling GOPs that are extracted every predetermined time. The function that was described in describing the principle of the sample collecting part 14 shown in FIG. 1 can be realized by the managing information sampling section 244's operating in response to such a sampling instruction.

Figure 17:
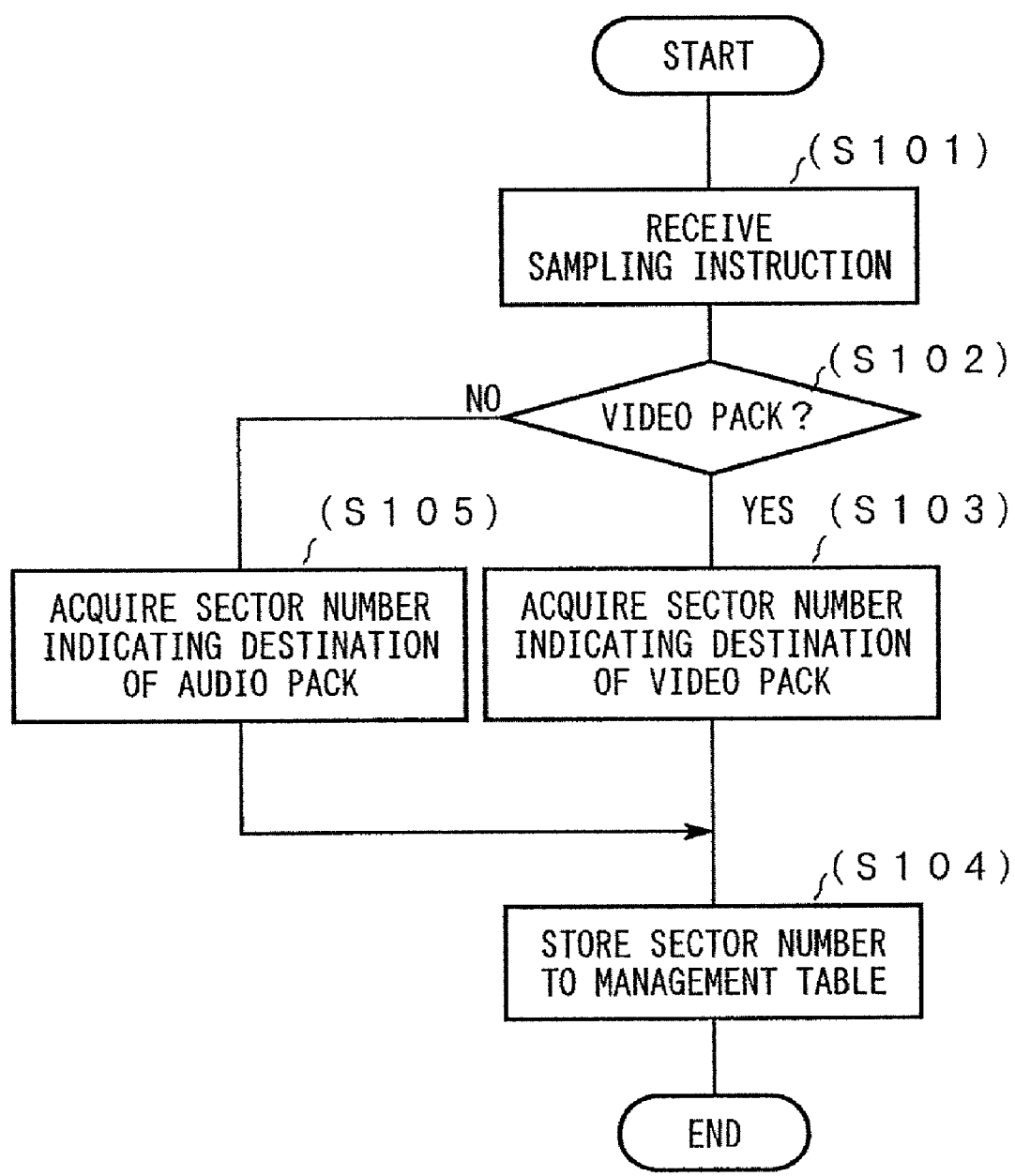
FIG. 17 is a flowchart showing a managing information sampling process.

FIG. 17 is a flowchart showing a managing information sampling process.

The managing information sampling section 244 shown in FIG. 12 starts to operate when receiving a sampling instruction as described above (step S101). First, the managing information sampling section 244 judges whether a new subject of writing is a video pack or an audio pack (step S102).

If the subject of writing is a video pack, the managing information sampling section 244 makes an affirmative judgment at step S102 and makes a transition to step S103, where the managing information sampling section 244 acquires a sector number indicating a storage destination of the video pack via the disk controlling device 213. The managing information sampling section 244 stores the acquired sector number in the management table 217 as a sector number corresponding to a sampling GOP (its head portion contained to the video pack) (step S104). The process is finished here.

On the other hand, if the subject of writing is an audio pack, the managing information sampling section 244 makes a negative judgment at step S102 and makes a transition to step S105, where the managing information sampling section 244 acquires a sector number indicating a storage destination of the audio pack via the disk controlling device 213. The managing information sampling section 244 stores the acquired sector number in the management table 217 as audio storage information indicating a storage location of the head AAU (step S104). The process is finished here.

By restricting GOPs and AAUs as subjects of managing information sampling in this manner, the size of managing information that is collected in the management table 217 can be made smaller than in the case of collecting managing information for all GOPs and corresponding AAUs.

In the stream data replaying apparatus shown in FIG. 12, a starting point finding section 225 and a replay controlling section 222 operate in response to instructions from a replay instruction analyzing section 224, to thereby control an operation that the data reading section 221 reads out an MPEG system stream. In this manner, a replay operation can be started from an arbitrary position in units of several GOPs (the number of GOPs will be determined according to a sampling time interval TS) that is set in the timer 257 based on the managing information held by the management table 217.

Embodiment 4

Figure 18:
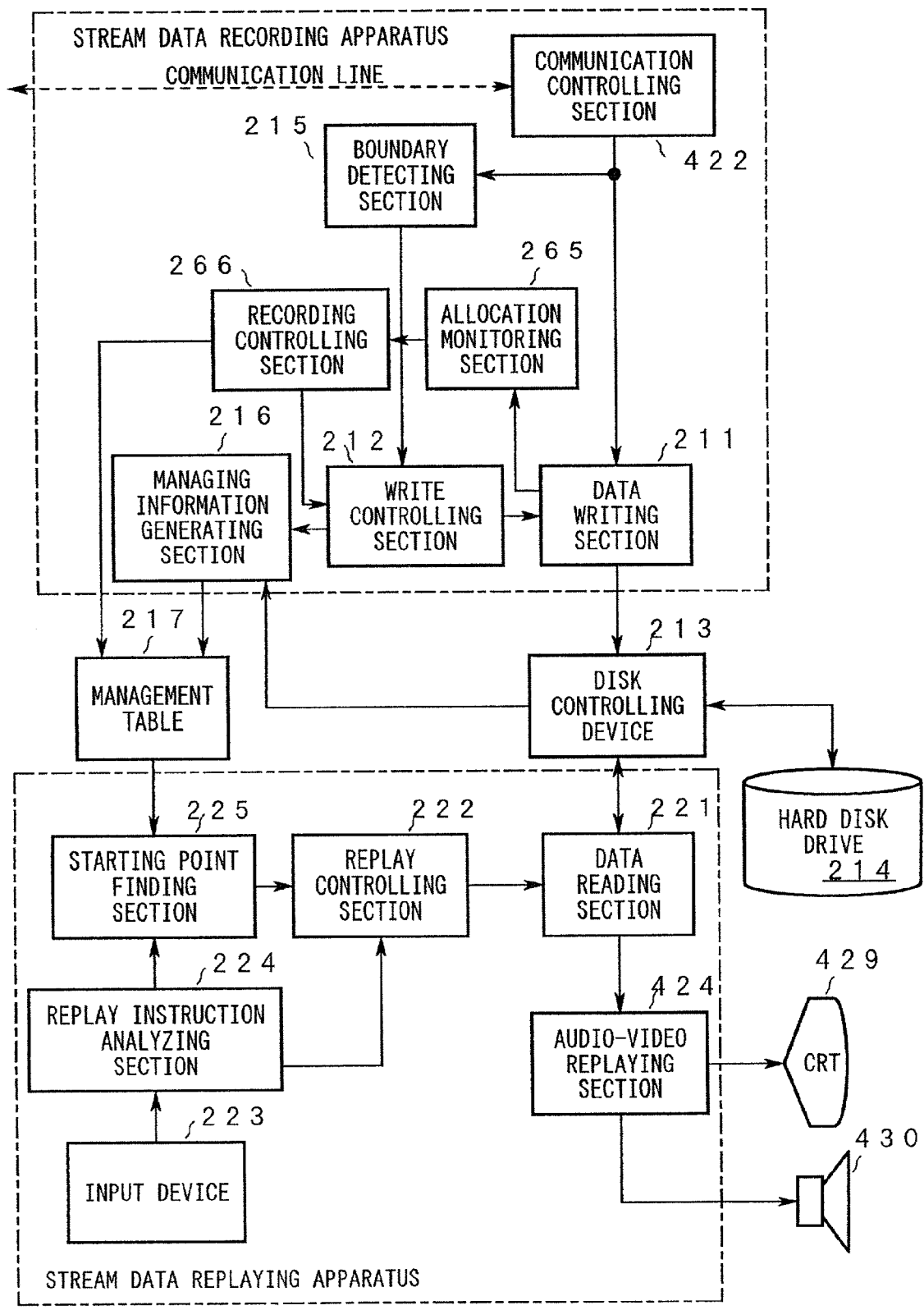
FIG. 18 shows the configuration of a stream data recording and replaying system according to a fourth embodiment of the invention.

FIG. 18 shows the configuration of a stream data recording and replaying system according to a fourth embodiment of the invention.

The stream data recording and replaying system shown in FIG. 18 is constructed by adding an allocation monitoring section 265 and a recording controlling section 266 to the stream data recording and replaying system of FIG. 4. The recording controlling section 266 controls the operation of the write controlling section 212 in a manner described later in response to a notice from the allocation monitoring section 265, whereby endless recording in a predetermined storage area (hereinafter referred to as an endless recording area) that is assigned in advance in the hard disk drive 214.

Figure 19:
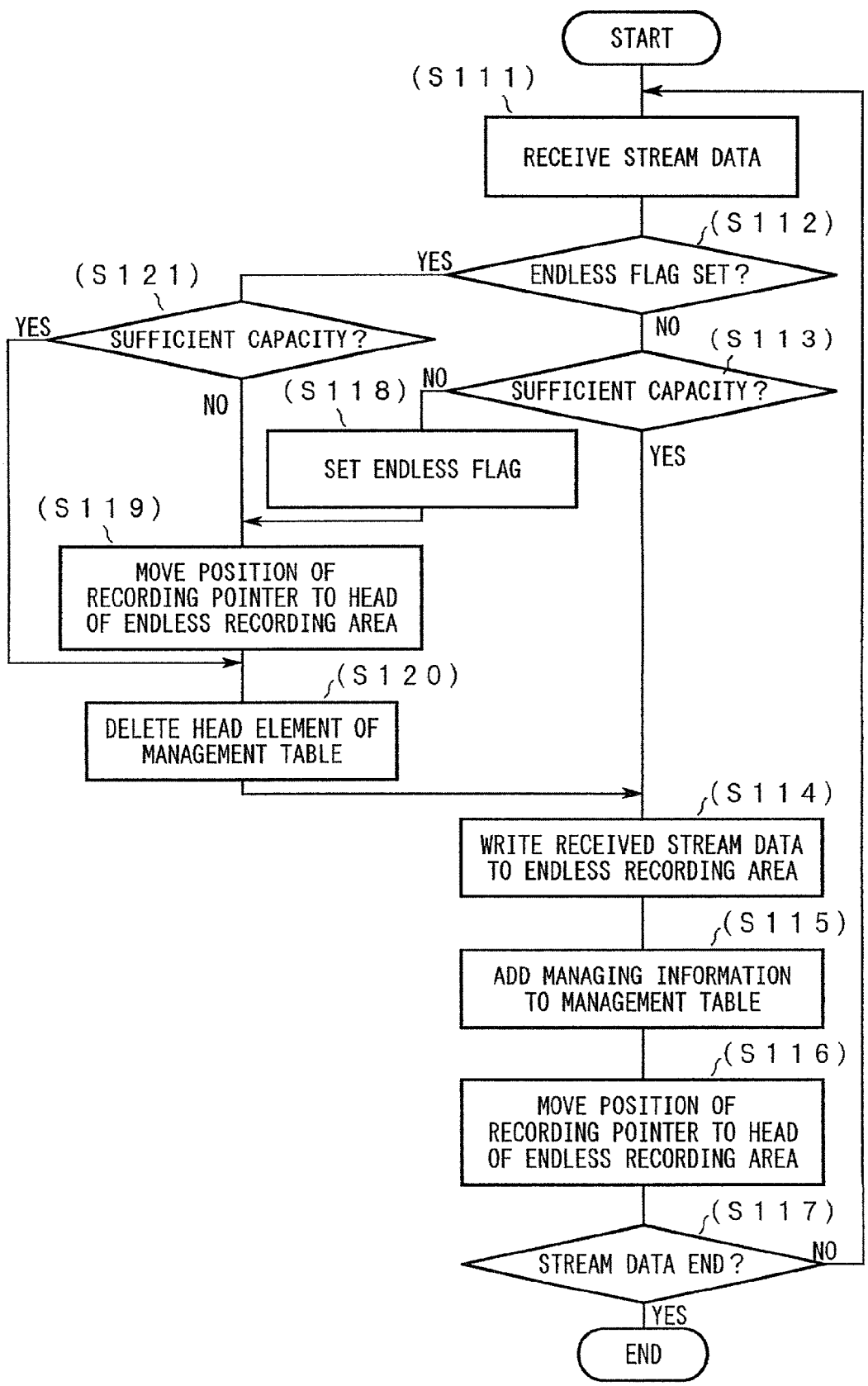
FIG. 19 is a flowchart showing an endless recording process.

FIG. 19 is a flowchart showing an endless recording process.

In response to input of stream data (step S111), the recording controlling section 266 judges whether an endless flag (described later) that is provided in the recording controlling section 266 is set (step S112). If the judgment result at step S112 is negative, the process goes to step S113.

The allocation monitoring section 265 shown in FIG. 18 corresponds to the shortage detecting part 16 shown in FIG. 1. The allocation monitoring section 265 monitors a write operation that is performed by the data writing section 211 in response to input of stream data. When the remaining capacity of the endless recording area has become short, the allocation monitoring section 265 informs the recording controlling section 266 about that.

For example, the allocation monitoring section 265 judges that the unused area of the endless recording area is sufficient if its capacity is larger than an average capacity $V_1$ that is necessary to store one GOP and a corresponding AAU group.

Figure 20:
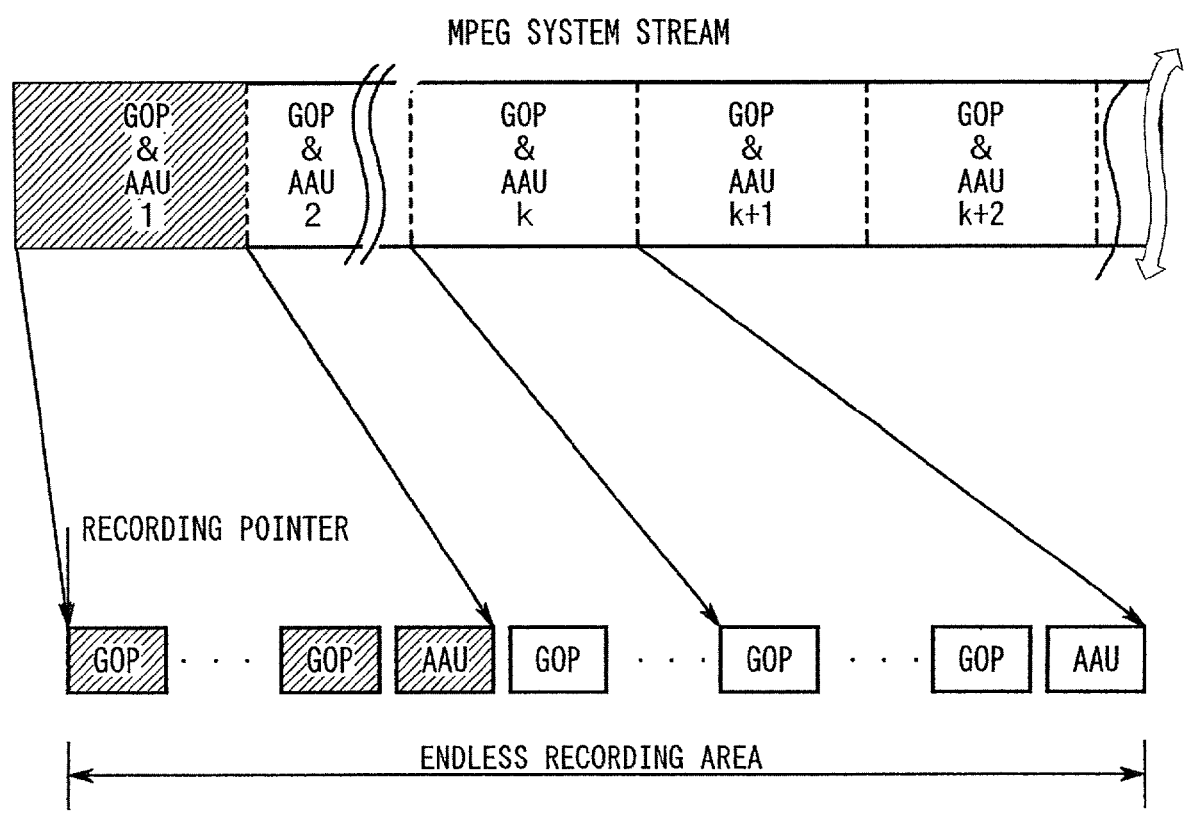
FIG. 20 illustrates how an endless recording operation is performed.

For example, when a head portion (denoted by GOP & AAU 1 in FIG. 20) of an MPEG system stream is to be recorded in the hard disk drive 214 as shown in FIG. 20, naturally a sufficient unused area remains in the endless recording area. The allocation monitoring section 265 informs the recording controlling section 266 about that.

In this case, the recording controlling section 266 makes an affirmative judgment at step S113 and instructs the writing controlling section 212 to perform an ordinary write operation. The data writing section 211 operates in response to an instruction from the writing controlling section 212, whereby a write operation is performed that is similar to one performed at steps S11-S20 shown in FIG. 5.

In this operation, stream data that is received at step S111 is written to the endless recording area of the hard disk drive 214 via the disc controlling device 213 (step S114). Then, necessary managing information is sampled and added to the management table 217 (step S115).

Then, the position of a recording pointer is updated, that is, moved to the head of the unused area (step S116) and it is judged whether the MPEG system stream has ended (step S117). If the judgment result is negative, the process returns to step S111 to start a recording operation on new stream data.

In this manner, input stream data are recorded in the endless recording area of the hard disk device 214 in order. For example, if the capacity of the unused area remaining in the endless recording area becomes smaller than the capacity $V_1$ when stream data consisting of a kth GOP and a corresponding MU group (see FIG. 20) has been input, the allocation monitoring section 265 informs the recording controlling section 266 that the unused area has become insufficient.

When receiving such a notice for the first time, the recording controlling section 266 makes a negative judgment at step S113 sets the endless flag that is provided in itself (step S118). Then, as shown in FIG. 20, the data writing section 211 moves, via the write controlling section 212, to the head of the endless recording area, the position of the recording pointer that indicates a position where stream data should be written next (step S119).

Then, the recording controlling section 266 deletes the managing information element that is held by the management table 217 as the managing information relating to the head GOP and the corresponding AAU group (denoted by GOP & AAU 1 in FIG. 20) of the MPEG system stream stored in the endless recording area (step S120). Then, the recording controlling section 266 makes a transition to step S114 to write the new stream data.

The stream data consisting of the kth GOP and the corresponding AAU group is stored in the storage area that is hatched in FIG. 20 in place of the stream data consisting of the first GOP and the corresponding AAU group.

After the endless flag is set in the above-described manner, an affirmative judgment is made at step S112 upon input of new stream data and the process goes to step S121. Then, the process goes to step S119 or S120 depending on the content of a notice from the allocation monitoring section 265.

The functions of the recording controlling part 18 and the managing information updating part 19 shown in FIG. 1 are realized by the recording controlling section 266's operating in the above-described manner in response to an instruction from the allocation monitoring section 265. In this way, endless recording of an MPEG system stream in a limited recording area of the hard disk drive 214 is enabled by writing new stream data while deleting the oldest stream data on a GOP-by-GOP basis.

Where the above endless recording technique is used, the endless recording area can be used as one file and hence can be managed just as easily as a file accommodating ordinary stream data is managed.

As described above, the managing information held by the management table 217 is updated as an endless recording operation is performed. Therefore, endlessly recorded to stream data can be replayed from a replay starting point that is specified arbitrarily in steps of one GOP as the replay instruction analyzing section 224 and the starting point finding section 225 executes steps S41-S44 shown in FIG. 8B based on the management table 217.

Embodiment 5

Figure 21:
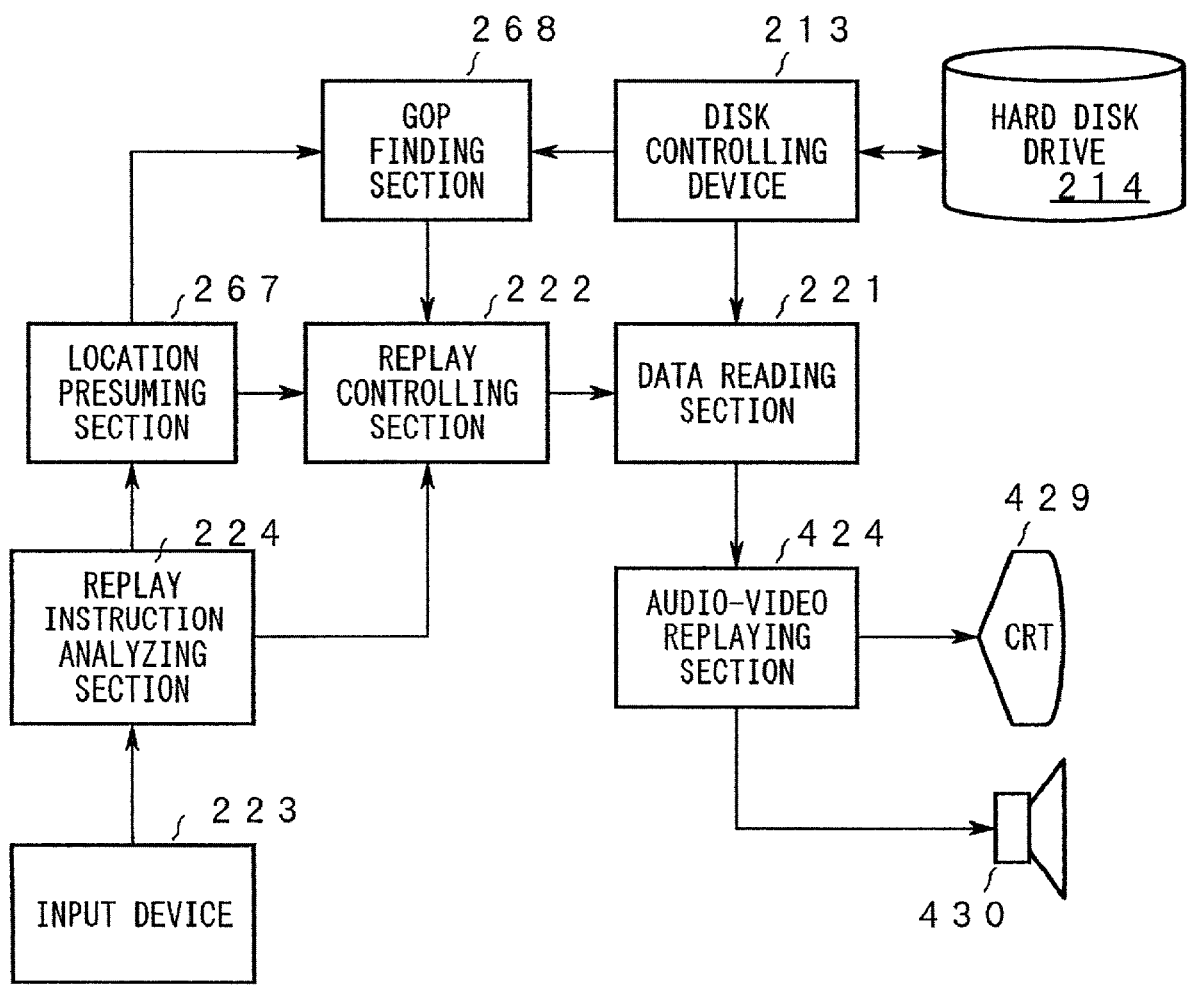
FIG. 21 shows the configuration of a stream data replaying apparatus according to a fifth embodiment of the invention.

FIG. 21 shows the configuration of a stream data replaying apparatus according to a fifth embodiment of the invention.

An MPEG system stream is stored in a hard disk drive 214 shown in FIG. 21. In response to an instruction from a replay controlling section 222, a data reading section 221 reads stream data from the hard disk drive 214 via a disk controlling device 213 and subjects the read-out stream data to processing of an audio-video replaying section 424.

In the hard disk drive 214, a head portion of every GOP and a head AAU corresponding to each GOP that constitute an MPEG system stream are stored from the heads of sectors. As such, the hard disk drive 214 realizes the function of the stream data storing part 11 shown in FIG. 2.

The stream data replaying apparatus shown in FIG. 21 is provided with a location presuming section 267 and a GOP finding section 268 in place of the starting point finding section 225 and the management table 217 shown in FIG. 4.

In this stream data replaying apparatus, the location presuming section 267 and the GOP finding section 268 search for, in a manner described later, a location in the hard disk drive 214 from which to start reading instead of an operation that the starting point finding section 225 determines a starting point based on the management table 217 at step S37 shown in FIG. 8A, whereby the function of the starting point search part 25 shown in FIG. 3 is realized. The replay controlling section 222 controls the operation of the data reading section 221 based on a search result of the GOP finding section 268.

Figure 22:
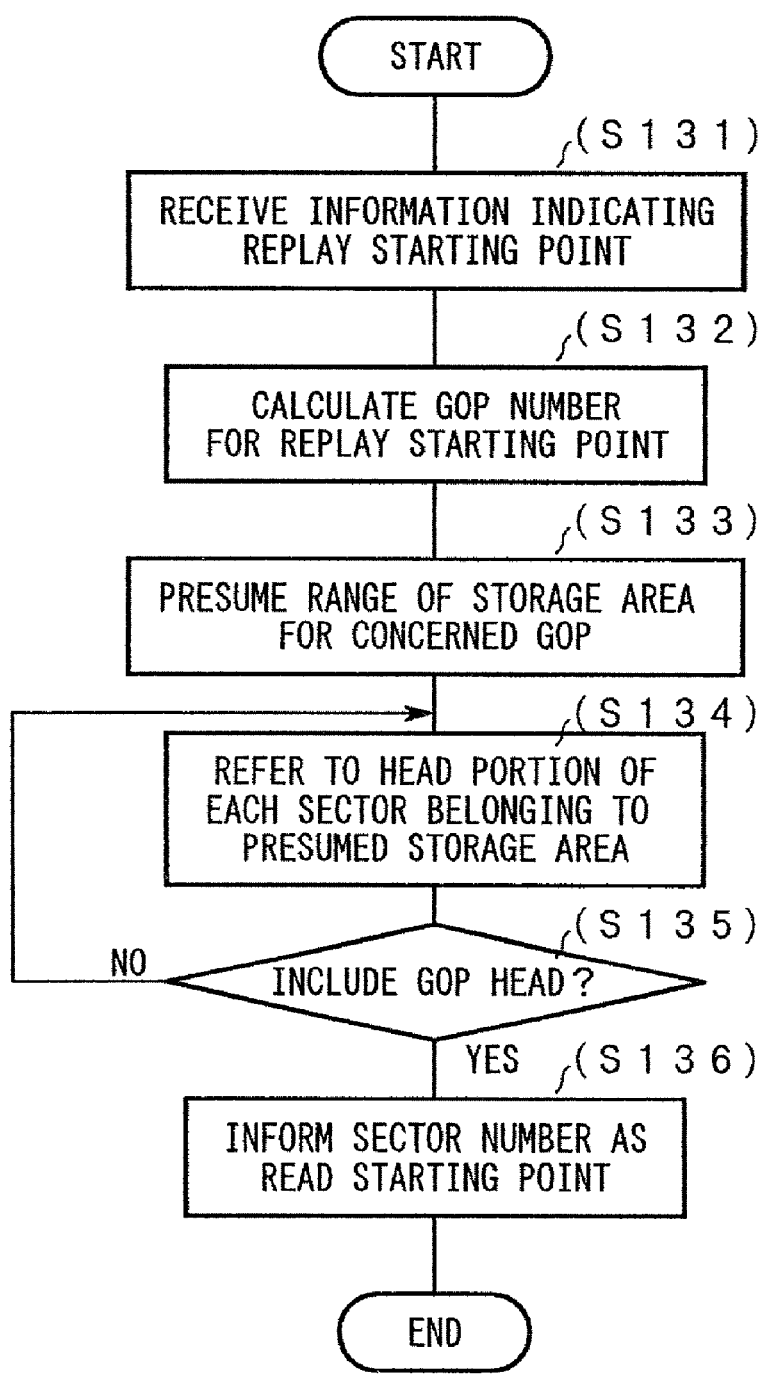
FIG. 22 is a flowchart showing a read starting point search process.
Figure 23:
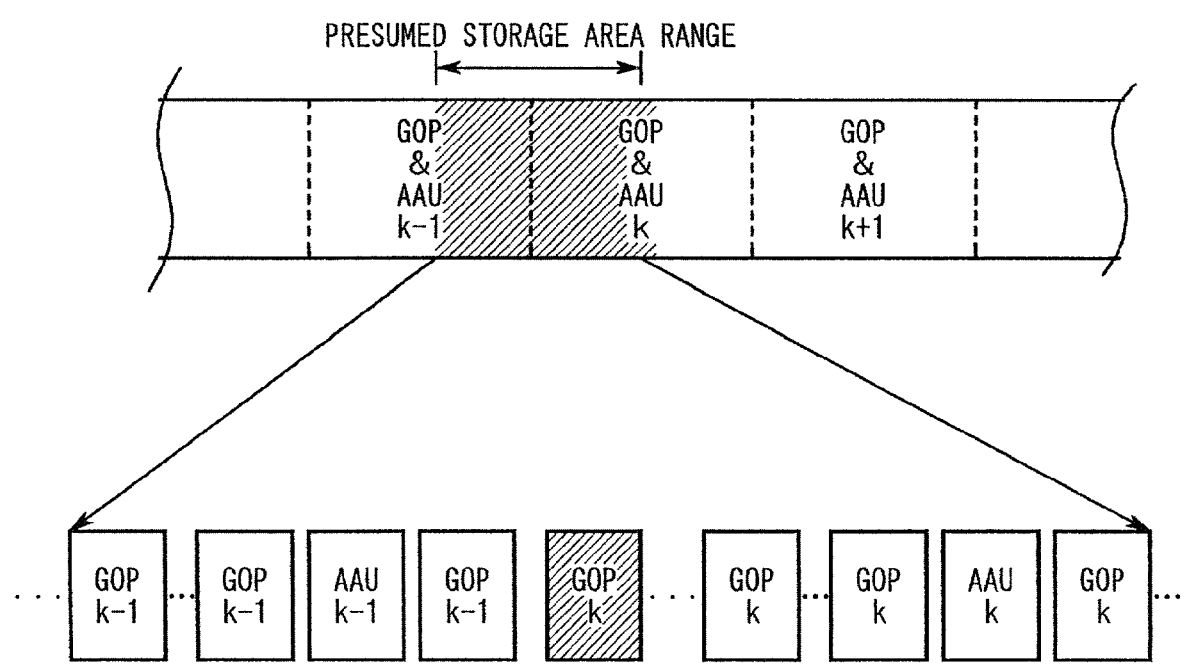

FIG. 22 is a flowchart showing a read starting point search process. FIG. 23 illustrates how a read starting point is searched for.

The location presuming section 267 starts operating when receiving information indicating a replay starting point that is included in analysis results of the replay instruction analyzing section 224 (step S131). First, based on this information, the location presuming section 267 calculates a GOP number corresponding to the replay starting point (step S132) in the same manner as the starting point finding section 224 does (see step S42 in FIG. 8).

Then, for example, the location presuming section 267 presumes a storage area range of the hard disk drive 214 where the GOP concerned is expected to be stored based on the GOP number obtained at step S132 and an average size $V_2$, in storage areas of the hard disk drive 214, of one GOP and an AAU group that is a series of AAUs corresponding to one GOP that constitute an MPEG system stream (step S133).

For example, if information received from the replay instruction analyzing section 224 indicates a kth GOP, the location presuming section 267 gives, to the GOP finding section 268, as a search range, a storage area expected to be corresponding to the second half of $GOP_{k-1}$ (k–1st GOP) and an AAU group corresponding to $GOP_{k-1}$ (denoted by GOP & AAU k–1 in FIG. 23) and the first half of $GOP_k$ (kth GOP) and an AAU group corresponding to $GOP_k$ (denoted by GOP & AAU k in FIG. 23).

On the other hand, the GOP finding section 268 starts operating in response to the search instruction in which the range presumed at step S133 is specified as a search range. The GOP finding section 268 repeats an operation of referring to, via the disk controlling device 213, a head portion of each sector included in the search range in the storage areas of the hard disk drive 214 (step S134) and an operation of judging whether it indicates that the head of a GOP is stored (step S135).

As described above, in the hard disk drive 214, the head of each GOP constituting an MPEG system stream is separated from video data belonging to the immediately preceding GOP and stored at the head of another sector (see FIG. 23).

Therefore, by repeating steps S134 and S135 for the sectors included in the search range shown in FIG. 23, for example, a sector where the head of a target GOP is stored (e.g., $GOP_k$) can be detected reliably.

When a sector where the head of a concerned GOP is stored is detected in the above manner, an affirmative judgment is made at step S135 and the process goes to step S136, where the GOP finding section 268 informs the replay controlling section 222 about the corresponding sector number as a read starting point. The process is finished here.

Another configuration is possible in which a sector where the head of a target GOP is stored is detected by performing the above-described search operation on all storage areas of the hard disk drive 214 where an MPEG system stream is stored in response to input of information that specifies a replay starting point.

In this case, a target GOP can be detected reliably even if the data amount of each GOP varies to a large extent.

A stream data editing apparatus can be constructed in such a manner that the above-described location presuming section 267 and GOP finding section 268 are provided in place of the management table 217, the table search section 235, and the table updating section 236 in the stream data editing apparatus of FIG. 9.

In this case, the location presuming section 267 and the GOP finding section 268 operate properly in accordance with analysis results of the edit instruction analyzing section 233, whereby the function of the target search part 30 is realized. The location finding section 234 determines a subject of an edit manipulation based on search results obtained by the GOP finding section 268, whereby the function of the target determining part 27 is realized.

Embodiment 6

Figure 24:
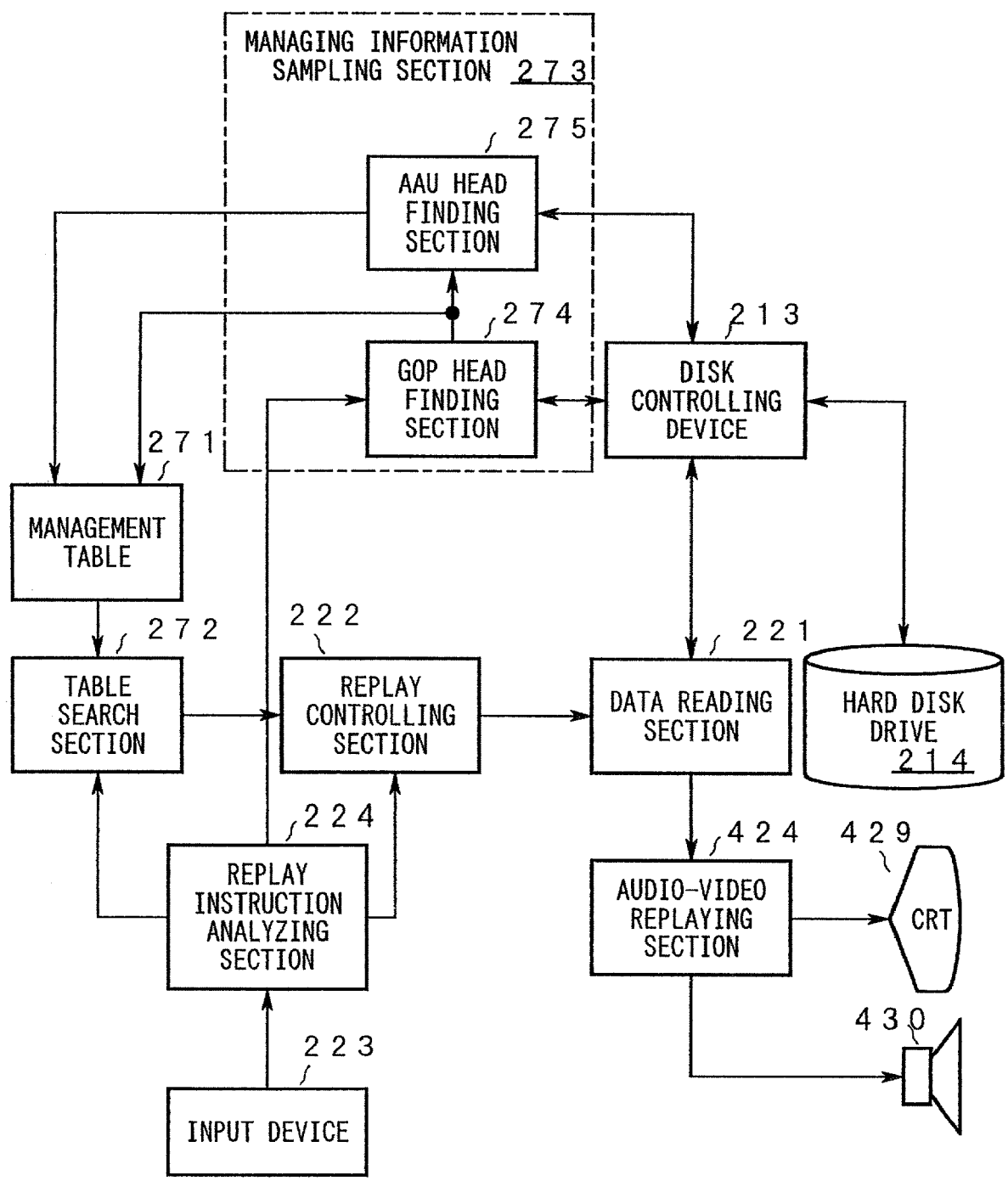
FIG. 24 shows the configuration of a stream data replaying apparatus according to a sixth embodiment of the invention.

FIG. 24 shows the configuration of a stream data replaying apparatus according to a sixth embodiment of the invention.

In the stream data replaying apparatus shown in FIG. 24, a management table 271 that is different from the management table 217 shown in FIG. 4, a table search section 272, and a managing information sampling section 273 are provided in place of the management table 217 and the starting point finding section 225 (see FIG. 4).

The hard disk drive 214 that is provided in this stream data replaying apparatus corresponds to the stream data storing part 11 shown in FIG. 2. In the hard disk drive 214, a head portion of every GOP and a head AAU corresponding to each GOP that constitute an MPEG system stream are stored from the heads of sectors.

Provided with a GOP head finding section 274 and an AAU head finding section 275, the managing information sampling section 273 shown in FIG. 24 samples managing information relating to MPEG system stream data being replayed in response to instructions from the replay instruction analyzing section 224, in a manner described later, and stores the sampled managing information in the management table 271.

On the other hand, in response to an instruction from the replay instruction analyzing section 224, the table search section 272 retrieves a sector number indicating a storage location of a GOP concerned from the management table 271 and subjects it to processing of the replay controlling section 222.

Figure 25:
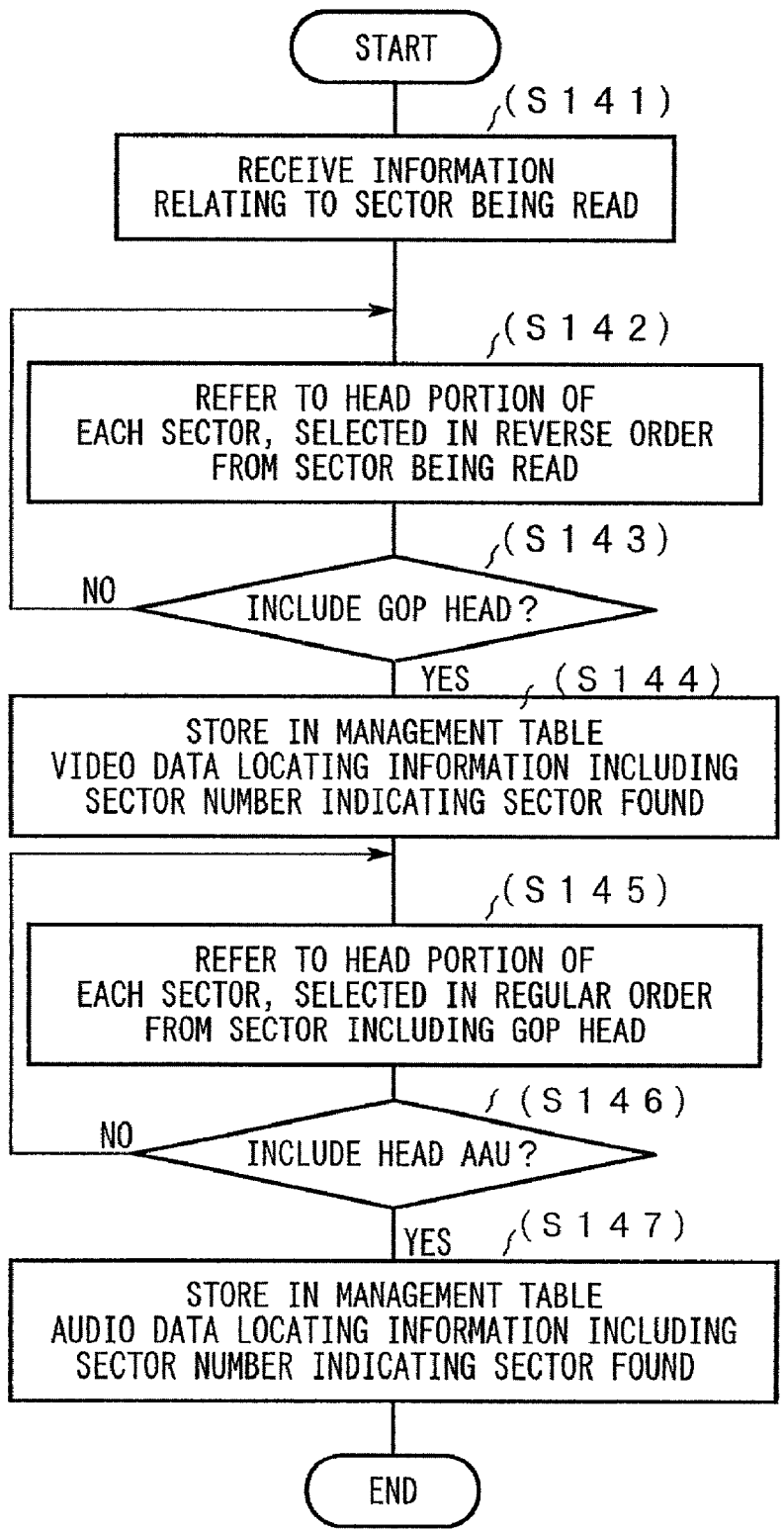
FIG. 25 is another flowchart showing a managing information sampling process.
Figure 27:
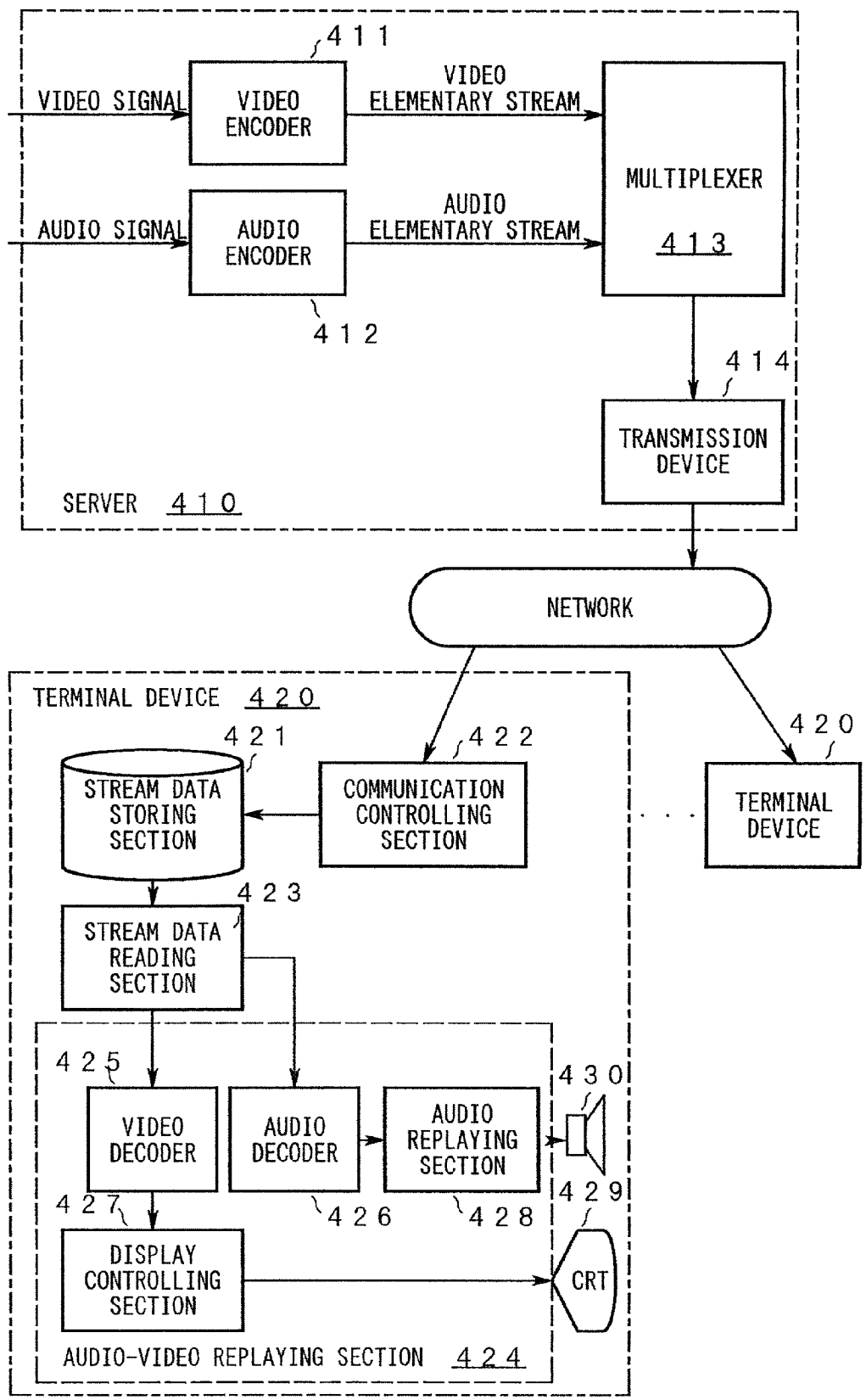
FIG. 27 shows the configuration of a digital audio-video delivery service system.
Figure 28:
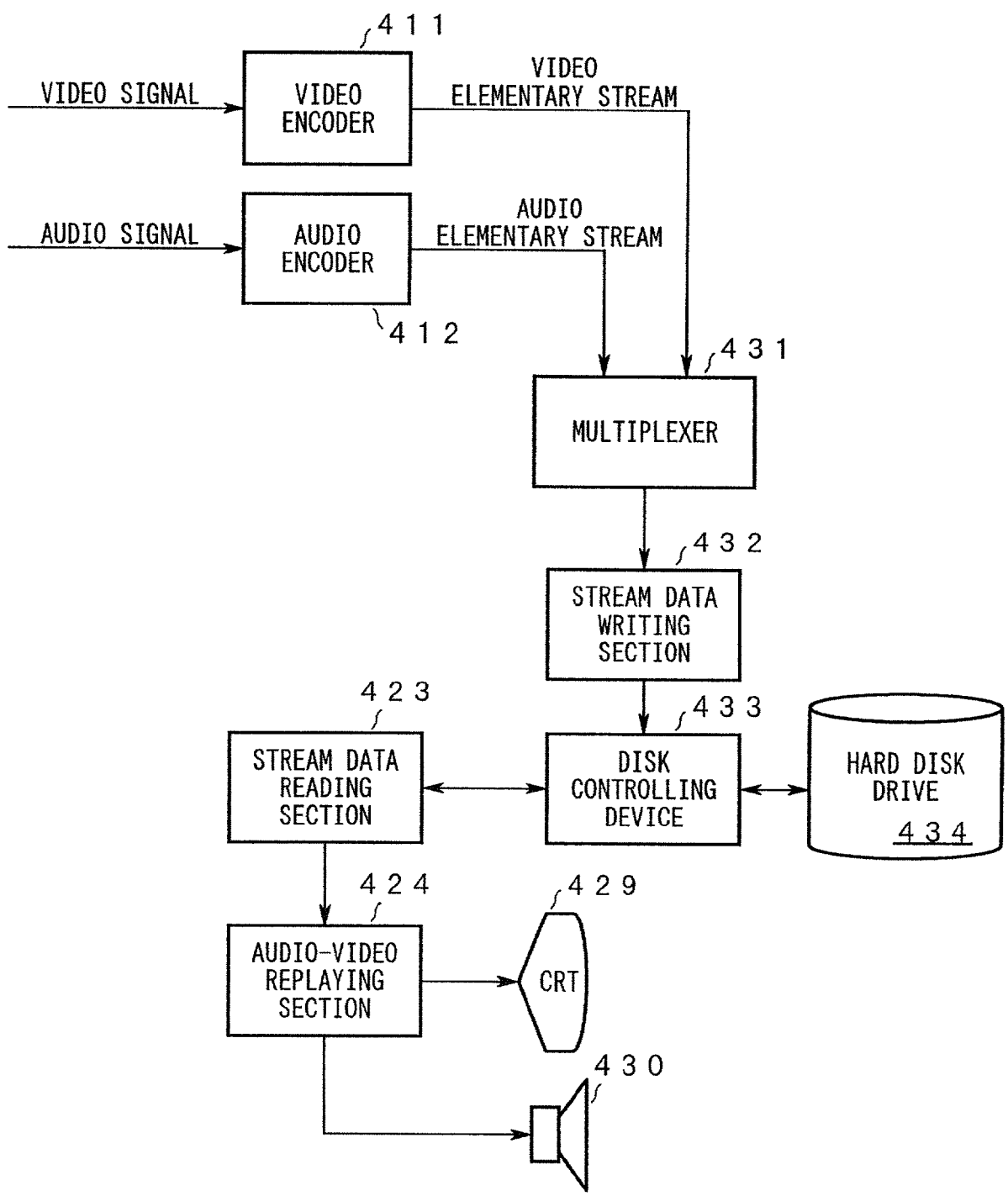
FIG. 28 shows the configuration of an exemplary stream data recording and replaying system.
Figure 29:
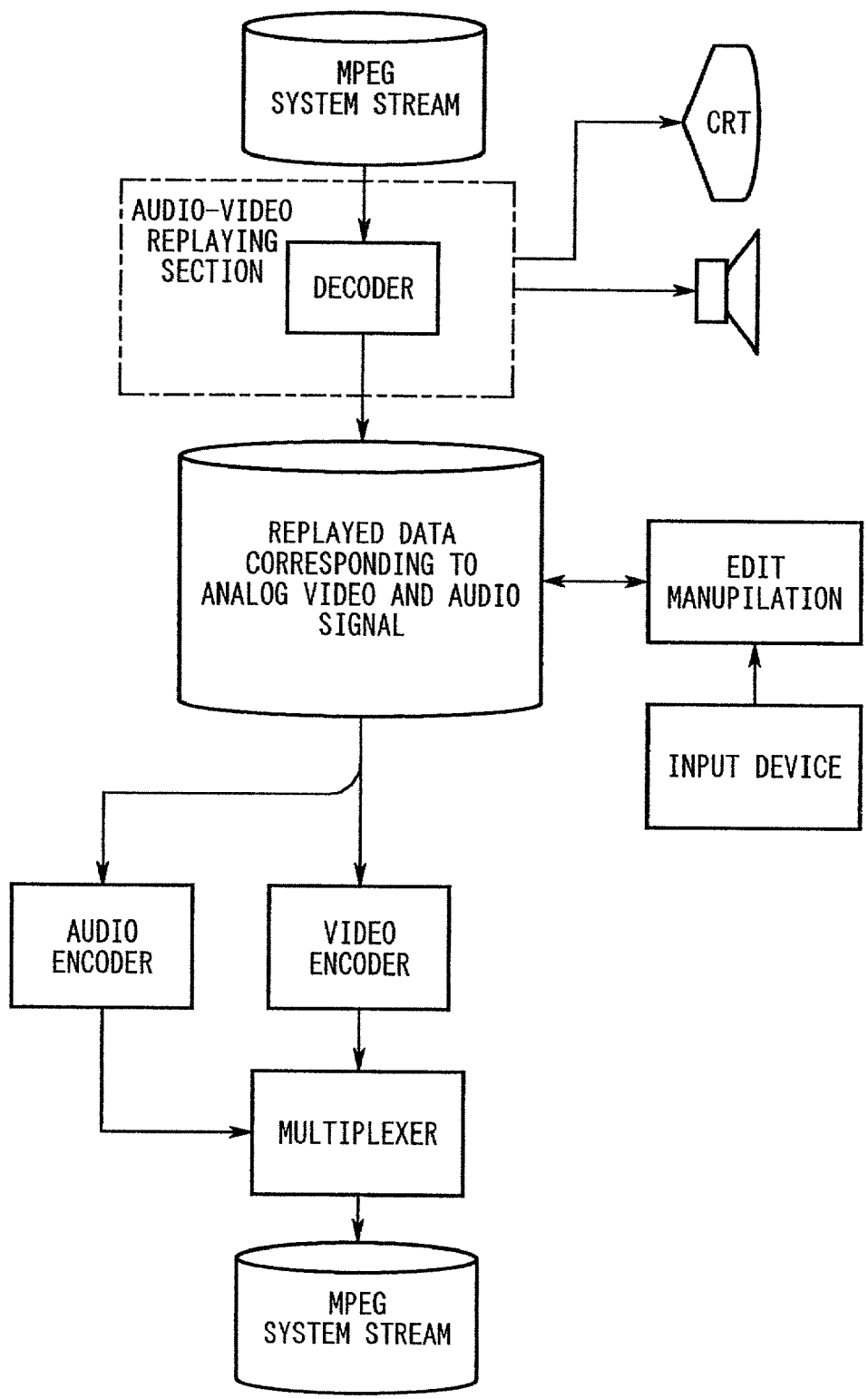
FIG. 29 illustrates a conventional stream data editing operation.

FIG. 25 is a flowchart showing a managing information sampling process. FIG. 26 shows another exemplary management table.

When a user manipulates the input device 233 during a replay of an MPEG system stream and a marking instruction to mark stream data being replayed is thereby input, the managing information sampling section 273 starts operating upon receiving analysis results from the instruction analyzing section 224.

First, the GOP head finding section 274 receives information relating to a sector from which data is being read by the data reading section 221 at this time point (step S141).

Then, the GOP head finding section 274 refers to a head portion of each sector (selected in reverse order from the above sector) by accessing the hard disk drive 214 via the disk controlling device 213 (step S142), and judges whether the sector accommodates a head portion of a GOP (step S143). Steps S142 and S143 are repeated as long as a negative judgment is made at step S143, whereby the head of the GOP being replayed at the time of input of the marking instruction is detected.

Upon detecting the head of the GOP, the GOP head finding section 274 makes an affirmative judgment at step S143 and makes a transition to step S144. At step S144, the GOP head finding section 274 stores, in the management table 271, as video data locating information corresponding to an identifier (e.g., mark M1) specified by the marking instruction, a GOP number (k) indicating the GOP whose head portion is stored in the sector concerned and a sector number (pk) indicating the sector concerned (see FIG. 26).

The AAU head finding section 275 starts operation upon being informed of the sector number thus obtained. The AAU head finding section 275 refers to a head portion of each sector in regular order from the informed sector number (step S145) and judges whether the sector accommodates ahead AAU (step S146). Steps S145 and S146 are repeated as long as a negative judgment is made at step S146, whereby a sector where the head AAU corresponding to the GOP concerned is stored is detected.

Upon detecting the head AAU, the AAU head finding section 275 makes an affirmative judgment at step S146 and makes a transition to step S147. At step S147, the AAU head finding section 275 stores a sector number (Ak) indicating this sector in the management table 271 as audio data locating information corresponding to the identifier (e.g., mark M1) specified by the marking instruction (see FIG. 26). The process is finished here.

As described above, the GOP head finding section 274 and the AAU head finding section 275 operate in accordance with analysis results of the instruction analyzing section 224, whereby the function of the locating information collecting part 24 shown in FIG. 2 is realized. As a result, managing information corresponding to a desired GOP can be collected selectively in accordance with an instruction from a user and stored in the management table 271.

In this case, only managing information relating to only GOPs specified by a user by means of a marking instruction is stored. Therefore, a storage capacity to be allocated to the management table 271 can be reduced greatly.

A jump to a GOP specified by a marking instruction can be done by performing a replay control operation as shown in FIGS. 8A and 8B using managing information that has been collected in the above-described manner.

Another configuration is possible in which the location presuming section 267 and the GOP finding section 268 shown in FIG. 21 is added to the stream data replaying apparatus of FIG. 24. Search results obtained by the GOP finding section 268 are accumulated in the management table 271, and the MU head finding section 275 operates based on the accumulated search results.

In this configuration, pieces of managing information relating to GOPs corresponding to locations specified by a user by means of optional replay instructions can be collected and used for subsequent replay control processing and edit processing.

The invention is not limited to the above embodiments and various modifications may be made without departing from the spirit and scope of the invention. Any improvement may be made in part or all of the components.

What is claimed is:

1. A stream data recording apparatus which records, in a stream data storing part, stream data that includes video coding units corresponding to groups of pictures of an MPEG system that are obtained by coding a video signal according to a predetermined digital coding scheme and audio coding units corresponding to audio access units of an MPEG system that are obtained by coding an audio signal according to a predetermined digital coding scheme, comprising:

a stream data input part inputting the stream data;

a type-boundary detecting part detecting boundaries of video information and audio information contained in the stream data, the boundaries being a head of each of the video coding units contained in the stream data and a head of a series of the audio coding units corresponding to each of the video coding units, and outputting boundary information indicating positions of the boundaries;

a recording part sectioning the stream data at the boundaries detected for the head of each of the video coding units and the boundaries detected for the audio coding units according to the boundary information, while maintaining an order of each of the video coding units and each of the audio coding units in the stream data, and recording the stream data in the stream data storing part, so that heads of the stream data being sectioned coincide with heads of access units of a randomly accessible recording medium that is provided in the stream data storing part, respectively;

a sample collecting part collecting video data locating information relating to storage locations of heads of at least a part of the video coding units and collecting audio data locating information relating to storage locations of heads of series of audio coding units corresponding to said part or more of the video coding units, the collecting done in correspondence to recording the stream data in the recording part; and a managing information storing part storing managing information that includes video data locating information indicating a location where the head of each of video coding units are stored and audio data locating information indicating a location where the head of a series of audio coding units corresponding to each of the video coding units are stored.

2. The stream data recording apparatus according to claim 1, further comprising:

a shortage detecting part detecting whether a predetermined storage area of the stream data storing part is short on available area, by monitoring an operation to record video coding units and audio coding units that is performed by the recording part, in response to an instruction to endlessly record input stream data in the predetermined storage area;

a recording controlling part moving, to a head of the predetermined storage area, a recording pointer that indicates a location of the stream data storing part where new stream data should be recorded, the moving done in accordance with a result of the detection by the shortage detecting part; and a managing information updating part deleting head video data locating information and head audio data locating information that are stored in the managing information storing part in accordance with the detection result of the shortage detecting part.

3. The stream data recording apparatus according to claim 1, further comprising a type-alternation detecting part monitoring stream data that is input to the recording part, detecting a boundary between data belonging to a video coding unit and data belonging to an audio coding unit, and supplying boundary information indicating a position of the boundary to the recording part.

4. The stream data recording apparatus according to claim 1, wherein the stream data input part comprises:

a video pack forming part dividing a video stream that includes video coding units into video packs that are equal in memory capacity to the access unit of the stream data storing part;

an audio pack forming part dividing an audio stream that includes audio coding units into audio packs that are equal in memory capacity to the access unit of the stream data storing part;

a packing controlling part monitoring operation of the video pack forming part and the audio pack forming part, and instructing separation to put the video stream or the audio stream into a new pack when a head of each video coding unit or a head of a series of audio coding units corresponding to each video coding unit appears; and a synthesizing part combining the video packs formed by the video pack forming part and the audio packs formed by the audio pack forming part to output as a single stream data.

5. The stream data recording apparatus according to claim 1, wherein the stream data input part comprises:

a video pack forming part dividing a video stream that includes video coding units into video packs that are equal in memory capacity to the access unit of the stream data storing part;

an audio pack forming part dividing an audio stream that includes audio coding units into audio packs that are equal in memory capacity to the access unit of the stream data storing part;

a packing controlling part monitoring operation of the video pack forming part and the audio pack forming part, and for instructing separation to put the video stream or the audio stream into a new pack when a head of each video coding unit or a head of a series of audio coding units corresponding to each video coding unit appears; and a synthesizing part combining the video packs formed by the video pack forming part and the audio packs formed by the audio pack forming part to output as a single stream data, and wherein:

the video pack forming part comprises a video pack stuffing part completing a video pack being formed by adding meaningless data that will be disregarded in a decoding process, the adding done in accordance with a remaining capacity in the video pack being formed and done prior to formation of a new video pack in response to the separation instruction; and the audio pack forming part comprises an audio pack stuffing part completing an audio pack being formed by adding meaningless data that will be disregarded in decoding process, the adding done in accordance with a remaining capacity of the audio pack being formed and done prior to formation of a new audio pack in response to the separation instruction.

6. The stream data recording apparatus according to claim 1, wherein the recording part comprises:

a vacant area detecting part detecting, in response to an input of the boundary information, a vacant area remaining in an access unit being recorded; and a sector stuffing part generating meaningless data that will be disregarded in a decoding process and adding the meaningless data to the access unit being recorded in accordance with a result of the detection by the vacant area detecting part.

7. The stream data recording apparatus according to claim 1, wherein said sample collecting part collects, every predetermined time, video data locating information relating to a video coding unit that is recorded by the recording part and audio data locating information relating to a series of audio coding unit corresponding to the video coding unit.

8. A stream data replaying apparatus, comprising:

a stream data storing part storing stream data providing compound contents composed of video and audio, in which video coding units corresponding to groups of pictures of an MPEG system and audio coding units corresponding to audio access units of an MPEG system meet an appropriate standard of their orders, and in which a head of each of plural video coding units and a head of a series of audio coding units corresponding to each of the video coding units included in stream data coincide with heads of access units of a randomly accessible storage medium, respectively;

a managing information storing part storing managing information that includes video data locating information indicating a location where the head of each of the video coding units are stored and audio data locating information indicating a location where the head of a series of audio coding units, corresponding to each of the video coding units, are stored;

a starting point retrieving part retrieving, from the managing information storing part, video data locating information and audio data locating information corresponding to the video data locating information, the retrieving done in response to an input of specifying information indicating the video coding unit at a replay starting point; and a replaying part reading out stream data stored in the stream data storing part according to the retrieved video data locating information and audio data locating information, and replaying video and audio based on stream data which is read out.

9. The stream data replaying apparatus according to claim 8, further comprising:

a managing information generating part collecting video data locating information relating to storage locations of heads of at least a part of the video coding units and for collecting audio data locating information relating to storage locations of heads of series of audio coding units corresponding to said part or more of the video coding units stored in the stream data storing part, by referring to access units of the stream data storing part prior to a replay operation of the stream data stored in the stream data storing part.

10. A stream data replaying apparatus, comprising:

a stream data storing part storing stream data providing compound contents composed of video and audio, in which video coding units corresponding to groups of pictures of an MPEG system and audio coding units corresponding to audio access units of an MPEG system meet an appropriate standard of their orders, and in which a head of each of plural video coding units and a head of a series of audio coding units corresponding to each of the video coding units included in stream data coincide with heads of access units of a randomly accessible storage medium, respectively;

a managing information storing part for storing managing information that includes video data locating information indicating a location where the head of each of video coding units are stored and audio data locating information indicating a location where the head of a series of audio coding units corresponding to each of the video coding units are stored;

a locating information collecting part for searching, in response to an input of specifying information indicating a video coding unit at a replay starting point, the stream data storing part to find a storage location of the video coding unit indicated by the specifying information and a storage location of a series of audio coding units corresponding to the video coding unit, collecting and outputting video data locating information and audio data locating information indicating the found storage locations, and storing the collected video data locating information and audio data locating information in the managing information storing part; and a replaying part for reading out stream data stored in the stream data storing part according to the retrieved video data locating information and audio data locating information, and replaying video and audio based on stream data which is read out.

11. A stream data replaying apparatus, comprising:

a stream data storing part storing stream data providing compound contents composed of video and audio, in which video coding units corresponding to groups of pictures of an MPEG system and audio coding units corresponding to audio access units of an MPEG system meet an appropriate standard of their orders, and in which a head of each of plural video coding units and a head of a series of audio coding units corresponding to each of the video coding units included in stream data coincide with heads of access units of a randomly accessible storage medium, respectively;

a starting point search part searching, in response to an input of specifying information indicating a video coding unit at a replay starting point, the stream data storing part to find a storage location of the video coding unit indicated by the specifying information and a storage location of a series of audio coding units corresponding to the video coding unit, and outputting video data locating information and audio data locating information indicating the found storage locations; and a replaying part reading out stream data stored in the stream data storing part according to the retrieved video data locating information and audio data locating information, and replaying video and audio based on stream data which is read out.

12. A stream data editing apparatus, comprising:

a stream data storing part storing stream data for providing compound contents composed of video and audio, in which video coding units corresponding to groups of pictures of an MPEG system and audio coding units corresponding to audio access units of an MPEG system meet an appropriate standard of their orders, and in which a head of each of plural video coding units and a head of a series of audio coding units corresponding to each of the video coding units included in stream data coincide with heads of access units of a randomly accessible storage medium, respectively;

a managing information storing part storing managing information that includes video data locating information indicating a location where the head of each of video coding units is stored and audio data locating information indicating a location where the head of a series of audio coding units, corresponding to each of the video coding units, is stored;

a distribution information retrieving part for retrieving, from the managing information storing part, video data locating information indicating storage locations of the video coding units indicated by range information included in edit instruction and audio data locating information indicating storage locations of audio coding units corresponding to these video coding units, the retrieving done in response to an input of the edit instruction including the range information indicating a range of video coding units as a subject of an edit manipulation;

a target determining part determining a storage area range of the stream data storing part based on the video data locating information and the audio data locating information corresponding to said range information;

an editing part performing the edit manipulation, specified by the edit instruction, on the storage area range determined according to the range information; and a result reflecting part reflecting video data locating information and audio data locating information changed in response to the edit manipulation by the editing part, on contents of the managing information storing part.

13. The stream data editing apparatus according to claim 12, wherein:

said target determining part determines, as a subject of the edit manipulation, a whole range of the storage area indicated by the video data locating information and the audio data locating information corresponding to the range information.

14. The stream data editing apparatus according to claim 12, wherein:

said target determining part determines, as a subject of the edit manipulation, a range excluding a storage area corresponding to part of the audio coding units, the range being a part of the storage area indicated by the video data locating information and the audio data locating information corresponding to the range information.

15. A stream data editing apparatus, comprising:

a stream data storing part storing stream data providing compound contents composed of video and audio, in which video coding units corresponding to groups of pictures of an MPEG system and audio coding units corresponding to audio access units of an MPEG system meet an appropriate standard of their orders, and in which a head of each of plural video coding units and a head of a series of audio coding units, corresponding to each of the video coding units, included in stream data coincide with heads of access units of a randomly accessible storage medium, respectively;

a managing information storing part storing managing information that includes video data locating information indicating a location where the head of each of plural video coding units are stored and audio data locating information indicating a location where the head of a series of audio coding units corresponding to each of the video coding units are stored;

a distribution information collecting part searching, in response to an input of edit instruction including range information indicating a video coding unit to be a subject of edit manipulation, the stream data storing part to find a storage location of the video coding unit indicated by the specifying information and a storage location of a series of audio coding units corresponding to the video coding unit, collecting and outputting video data locating information and audio data locating information indicating the found storage locations, and storing the collected video data locating information and audio data locating information in the managing information storing part;

a target determining part determining a storage area range of the stream data storing part based on the video data locating information and the audio data locating information corresponding to said range information;

an editing part for performing the edit manipulation, specified by the edit instruction, on the storage area range determined according to the range information; and a result reflecting part reflecting video data locating information and audio data locating information changed in response to the edit manipulation by the editing part, on contents of the managing information storing part.

16. The stream data editing apparatus according to claim 15, wherein:

said target determining part determines, as a subject of the edit manipulation, a whole range of the storage area indicated by the video data locating information and the audio data locating information corresponding to the range information.

17. The stream data editing apparatus according to claim 15, wherein:

said target determining part determines, as a subject of the edit manipulation, a range excluding a storage area corresponding to part of the audio coding units, the range being a part of the storage area indicated by the video data locating information and the audio data locating information corresponding to the range information.

18. A stream data editing apparatus, comprising:

a stream data storing part storing stream data providing compound contents composed of video and audio, in which video coding units corresponding to groups of pictures of an MPEG system and audio coding units corresponding to audio access units of an MPEG system meet an appropriate standard of their orders, and in which a head of each of plural video coding units and a head of a series of audio coding units corresponding to each of the video coding units included in stream data coincide with heads of access units of a randomly accessible storage medium, respectively;

a target search part searching, in response to an input of edit instruction including range information indicating a video coding unit to be a subject of edit manipulation, the stream data storing part to find a storage location of the video coding unit indicated by the specifying information and a storage location of a series of audio coding units corresponding to the video coding unit, and outputting video data locating information and audio data locating information indicating the found storage locations;

a target determining part determining a storage area range of the stream data storing part based on the video data locating information and the audio data locating information corresponding to said range information; and an editing part performing the edit manipulation, specified by the edit instruction, on the storage area range determined according to the range information.

19. The stream data editing apparatus according to claim 18, wherein:

said target determining part determines, as a subject of the edit manipulation, a whole range of the storage area indicated by the video data locating information and the audio data locating information corresponding to the range information.

20. The stream data editing apparatus according to claim 18, wherein:

said target determining part determines, as a subject of the edit manipulation, a range excluding a storage area corresponding to part of the audio coding units, the range being a part of the storage area indicated by the video data locating information and the audio data locating information corresponding to the range information.

* * * * *